United States Patent
Stracovsky et al.

(10) Patent No.: US 6,587,894 B1
(45) Date of Patent: *Jul. 1, 2003

(54) APPARATUS FOR DETECTING DATA COLLISION ON DATA BUS FOR OUT-OF-ORDER MEMORY ACCESSES WITH ACCESS EXECUTION TIME BASED IN PART ON CHARACTERIZATION DATA SPECIFIC TO MEMORY

(75) Inventors: Henry Stracovsky, San Jose; Piotr Szabelski, Santa Clara, both of CA (US)

(73) Assignee: Infineon Technologies AG, Munich (DE)

( * ) Notice: Subject to any disclaimer, the term of this patent is extended or adjusted under 35 U.S.C. 154(b) by 168 days.

This patent is subject to a terminal disclaimer.

(21) Appl. No.: 09/712,993

(22) Filed: Nov. 14, 2000

Related U.S. Application Data

(63) Continuation of application No. 09/439,276, filed on Nov. 12, 1999, now Pat. No. 6,216,178.
(60) Provisional application No. 60/108,930, filed on Nov. 16, 1998.

(51) Int. Cl.[7] .......................... G06F 12/00; G06F 13/00; G06F 13/36; G06F 13/38; G06F 9/00
(52) U.S. Cl. ................................. 710/6; 710/5; 710/29; 710/36; 710/40; 710/41; 710/58; 710/116; 710/123; 710/244; 709/100; 709/102; 709/103; 711/158; 711/167; 712/216
(58) Field of Search ............................. 710/5, 6, 7, 20, 710/25, 29, 35, 36, 39, 40, 41, 43, 45, 52, 58, 59, 112, 115–118, 122–125, 244; 709/100, 102, 103, 104, 107, 207; 711/158, 167, 168, 169; 712/214–219

(56) References Cited

U.S. PATENT DOCUMENTS

| | | | |
|---|---|---|---|
| 4,633,434 A | | 12/1986 | Scheuneman |
| 5,099,449 A | * | 3/1992 | Dombrosky et al. ........... 712/1 |
| 5,226,126 A | * | 7/1993 | McFarland et al. ......... 712/218 |
| 5,251,309 A | | 10/1993 | Kinoshita et al. |
| 5,325,525 A | | 6/1994 | Shan et al. |
| 5,465,335 A | | 11/1995 | Anderson |
| 5,655,096 A | | 8/1997 | Branigin |
| 5,694,577 A | | 12/1997 | Kiyohara et al. |
| 5,699,537 A | * | 12/1997 | Sharangpani et al. ....... 712/217 |
| 5,752,030 A | | 5/1998 | Konno et al. |
| 5,758,051 A | * | 5/1998 | Moreno et al. ................ 714/2 |

(List continued on next page.)

Primary Examiner—Thomas Lee
Assistant Examiner—Tanh Q Nguyen
(74) Attorney, Agent, or Firm—Beyer Weaver & Thomas LLP

(57) ABSTRACT

According to the present invention, a system for reordering commands to achieve an optimal command sequence based on a target response restriction is disclosed. A data queue coupled to a command queue is arranged to store a time indicating when the data transfer will appear on the data bus between the controller for an already issued request to the target device as well as arranged to store the burst bit and the read/write bit (r/w). The system also includes a collision detector coupled to the data queue and the command queue arranged to detect the possible collisions on the data bus between the issued command that is stored in the command queue and already issued commands that are stored in the data queue. A queues and link controller is coupled to the collision detector and the data queue and the command queue and is arranged to store and reorder commands to be issued wherein the controller calculates the new issue time of commands as well as a time when the data appears on the data bus.

10 Claims, 31 Drawing Sheets

U.S. PATENT DOCUMENTS

| | | | |
|---|---|---|---|
| 5,832,293 A | * 11/1998 | Popescu et al. | 712/23 |
| 5,832,304 A | * 11/1998 | Bauman et al. | 710/40 |
| 5,848,258 A | 12/1998 | Fenwich et al. | |
| 5,940,582 A | 8/1999 | Akabori et al. | |
| 5,964,867 A | 10/1999 | Anderson et al. | |
| 5,983,335 A | * 11/1999 | Dwyer, III | 712/23 |
| 5,996,060 A | * 11/1999 | Mendelson et al. | 712/205 |
| 6,052,695 A | * 4/2000 | Abe et al. | 707/202 |
| 6,065,105 A | * 5/2000 | Zaidi et al. | 712/23 |
| 6,079,012 A | * 6/2000 | Morris et al. | 712/216 |
| 6,081,873 A | * 6/2000 | Hetherington et al. | 711/131 |
| 6,098,168 A | * 8/2000 | Eisen et al. | 712/218 |
| 6,112,265 A | * 8/2000 | Harriman et al. | 710/40 |
| 6,145,052 A | * 11/2000 | Howe et al. | 711/112 |
| 6,205,498 B1 | * 3/2001 | Habusha et al. | 710/29 |
| 6,243,788 B1 | * 6/2001 | Franke et al. | 711/3 |

* cited by examiner

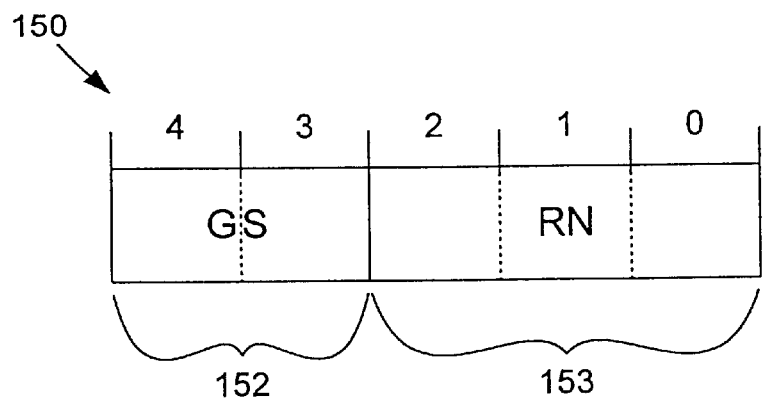
RN - Request Number
GS - Group Selector
Fig. 1E.1
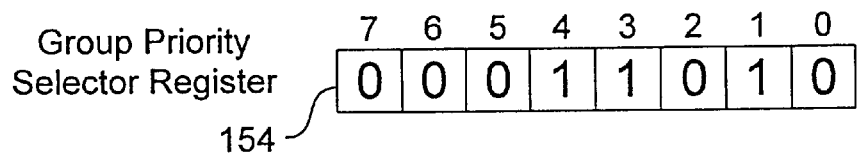
Fig. 1E.2
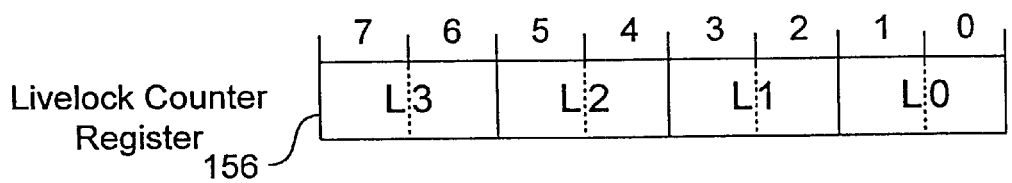
L3...L0 - Livelock for priority "00" to "11"
Fig. 1E.3 state of tag after request processed

Table 4

| in_command | region | | Virtual Bank | | | | Replacement | LUT inputs | ΔT |
|---|---|---|---|---|---|---|---|---|---|
| | | | 0 | 1 | 2 | 3 | | | |
| open @ 1000 | 100 | 400 | | | | | 0 | | 0 |
| page read @1000 | 100 | 400 | 100 open | | | | 1 | open page read region 0 | 3φ |
| page write @1001 | 100 | 400 | 100 page read | | | | 2 | page read page write region 0 | 2φ |
| open @ 1001 | 10 | 200 | 100 page write | | | 200 open | 3 | open | 0 |
| page read @ 1001 | 100 | 400 | 100 page read | | | | 0 | page read page write region 0 | 1 |

Fig. 24

APPARATUS FOR DETECTING DATA COLLISION ON DATA BUS FOR OUT-OF-ORDER MEMORY ACCESSES WITH ACCESS EXECUTION TIME BASED IN PART ON CHARACTERIZATION DATA SPECIFIC TO MEMORY

CROSS REFERENCE TO RELATED APPLICATIONS

This application is a Continuation application of prior Application Ser. No. 09/439,276 filed on Nov. 12, 1999 now U.S. Pat. No. 6,216,178 and entitled "METHODS AND APPARATUS FOR DETECTING THE COLLISION OF DATA ON A DATA BUS IN CASE OF OUT-OF-ORDER MEMORY ACCESSES OR DIFFERENT TIMES OF MEMORY ACCESS EXECUTION", the disclosure of which is incorporated herein by reference which also claims benefit of priority under 35 U.S.C. §119(e) of U.S. Provisional Application No. 60/108,930, filed Nov. 16, 1998.

FIELD OF THE INVENTION

The present invention pertains generally to computing systems. More specifically, the present invention relates to a providing access to shared resources in a computing system such as multi-processor computer systems and the like. More particularly, techniques for detecting the collision of data on a data bus in case of out-of-order memory accesses or different times of memory access execution are described.

BACKGROUND OF THE INVENTION

In the basic computer system, a central processing unit, or CPU, operates in accordance with a pre-determined program or set of instructions stored within an associated memory. In addition to the stored instruction set or program under which the processor operates, memory space either within the processor memory or in an associated additional memory, is provided to facilitate the central processor's manipulation of information during processing. The additional memory provides for the storage of information created by the processor as well as the storage of information on a temporary, or "scratchpad", basis which the processor uses in order to carry out the program. In addition, the associated memory provides locations in which the output information of the processor operating set of instructions are placed in order to be available for the system's output device(s).

In systems in which many components (processors, hard drive, etc) must share a common bus in order to access memory presents there is a high probability of memory access conflicts. Especially in the case of multiprocessor computer systems, and the like, in which systems utilizing different processors are simultaneously in operation, access to memory or other shared resources, becomes complex. Since it is likely that each of the processors or processor systems may require access to the same memory simultaneously, a conflict between processors will generally be unavoidable. Essentially, the operation of two or more processors or processor systems periodically results in overlap of the memory commands with respect to a common memory, or other shared resource, in the multi-processor computer system.

Conventional approaches to solving the problem of conflicting memory access requests to a shared memory include, in one case, complete redundancy of the memories used for each of the processors, and isolation of the processor systems. However, this approach to solving the problem of conflicting memory access requests often defeats the intended advantage of the multiple processor system. Such multiple processor systems are most efficient if operated in such a manner as to provide parallel computing operations upon the same data in which one processor supports the operation of the other. Conventionally, such processor systems may be either time shared in which the processors compete for access to a shared resource, such as memory, or the processor systems may be dual ported in which each processor has its own memory bus, for example, where one is queued while the other is given access.

Various approaches have been used to avoid the above described conflict problems. In one approach, the avoidance of conflicts is accomplished by sequentially operating the processors or by time sharing the processors. In this way, the processors simply "take turns" accessing the shared resource in order to avoid conflict. Such systems commonly used include "passing the ring" or "token systems" in which the potentially conflicting processors are simply polled by the system in accordance with a pre-determined sequences similar to passing a ring about a group of users.

Unfortunately, use of sequential processor access methodologies imposes a significant limitation upon the operation of the overall computer system. This limitation arises from the fact that a substantial time is used by the system in polling the competing processors. In addition, in the case where a single processor is operating and requires access to the shared memory, for example, a delay between the processor accesses to the shared resource is created following each memory cycle as the system steps through the sequence.

Another conventional approach to conflict avoidance relies upon establishing priorities amongst the processors in the computer system. One such arrangement provides for every processor having assigned to it a priority with the hierarchy of system importance. The memory controller simply provides access to the highest priority processor every time a conflict occur. For example, in a two processor system, a first and a second processor access a shared memory which is typically a dynamic RAM (DRAM) type memory device which requires periodic refreshing of the memory maintain stored data. Generally, the DRAM type memory is refreshed by a separate independent refresh system. In such a multi-processor system, both the processors and the refresh system compete for access to the common memory. A system memory controller will process memory access request conflicts, or commands, as determined by the various priorities assigned to the processors and the refresh system. While such systems resolve conflicts and are somewhat more efficient than pure sequential conflict avoidance systems, it still suffers from lack of flexibility.

Another approach to conflict resolution involves decision-making capabilities incorporated into the memory controller. Unfortunately, because the decision making portions of the memory controller are operated under the control and timing of a clock system, a problem arises in the substantial time is utilized in performing the actual decision making before the memory controller can grant access to the common memory.

Unfortunately, this problem of performing the actual decision making substantially erodes the capability of conventional memory controllers granting access to multi-bank type memory systems. In multi-bank type memory systems, the actual memory core is departmentalized into specific regions, or banks, in which data to be retrieved is stored. Although providing faster and more efficient memory access, the complexity required of conventional memory controllers in coping with a multi-bank memory device substantially slows the overall access time of the system as a whole.

In view of the foregoing, it should be apparent that techniques for detecting the collision of data on a data bus in case of out-of-order memory accesses or different times of memory access execution are desired.

SUMMARY OF THE INVENTION

According to the present invention, techniques for detecting the collision of data on a data bus in case of out-of-order memory accesses or different times of memory access execution are described. A method for reordering commands to achieve an optimal command sequence based on a target response restriction that determines an optimal slot for a data transfer between an initiator controller and a target subsystem by prohibiting an issuance of a command that would cause a data conflict includes the following operations. At a command queue, a command to be issued, a time indicating when the data transfer appears on a data bus between the controller and the target device after the command was issued to the target, and a burst-bit indicating data burst transfer and a read/write bit (r/w) are stored. In a data queue coupled to the command queue, a time indicating when the data transfer will appear on the data bus between the controller for an already issued request to the target device, and the burst bit and the read/write bit (r/w) are stored. At a collision detector coupled to the data queue and the command queue, the possible collisions on the data bus between the issued command that is stored in the command queue and already issued commands that are stored in the data queue are detected and target subsystem characterization data at a target subsystem characterization data base; and at a queues and link controller coupled to the collision detector, commands to be issued wherein the controller calculates the new issue time of commands as well as a time when the data appears on the data bus, wherein the new issue time is based at least in part on the target subsystem characterization data, and storing the reordered commands.

A further understanding of the nature and advantages of the present invention may be realized by reference to the remaining portions of the specification and the drawings.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1E shows an exemplary request/response ID number in accordance with an embodiment of the invention;

FIG. 24 shows Table 4 representing an exemplary operation of the restriction block 1100 shown in FIG. 11.

DETAILED DESCRIPTION OF THE PREFERRED EMBODIMENTS

In systems where several devices, such as processors, share a common resource, various approaches have been used to avoid the conflicts that typically when more than one device requires access to the shared resource. In one approach, the avoidance of conflicts is accomplished by sequentially operating the processors or by time sharing the processors. In this way, the processors simply "take turns" accessing the shared resource in order to avoid conflict. Such systems commonly used include "passing the ring" or "token systems" in which the potentially conflicting processors are simply polled by the system in accordance with a pre-determined sequences similar to passing a ring about a group of users.

Unfortunately, these sequential access methodologies generally impose a significant limitation upon the operation of the overall computer system since a substantial amount of time is used in polling the competing processors.

Another conventional approach to conflict avoidance relies upon establishing priorities amongst the processors in the computer system. One such arrangement provides for every processor having assigned to it a priority with the hierarchy of system importance. While such systems resolve conflicts and are somewhat more efficient than pure sequential conflict avoidance systems, it still suffers from lack of flexibility.

Another conventional approach to conflict resolution involves decision-making logic incorporated into a controller type device. Unfortunately, the complexity of the decision making logic requires that a substantial amount of time be utilized in performing the actual decision making before the controller can grant access to the shared memory.

The problem of complex logic slowing system performance is exacerbated in as multi-chip module type memory systems having memory dispersed amongst a number of interconnected memory devices each having different operating characteristics. Since a conventional logic cannot be configured to compensate for each of the different access characteristics inherent in the various memory devices, overall system performance is compromised.

Figure 1A:
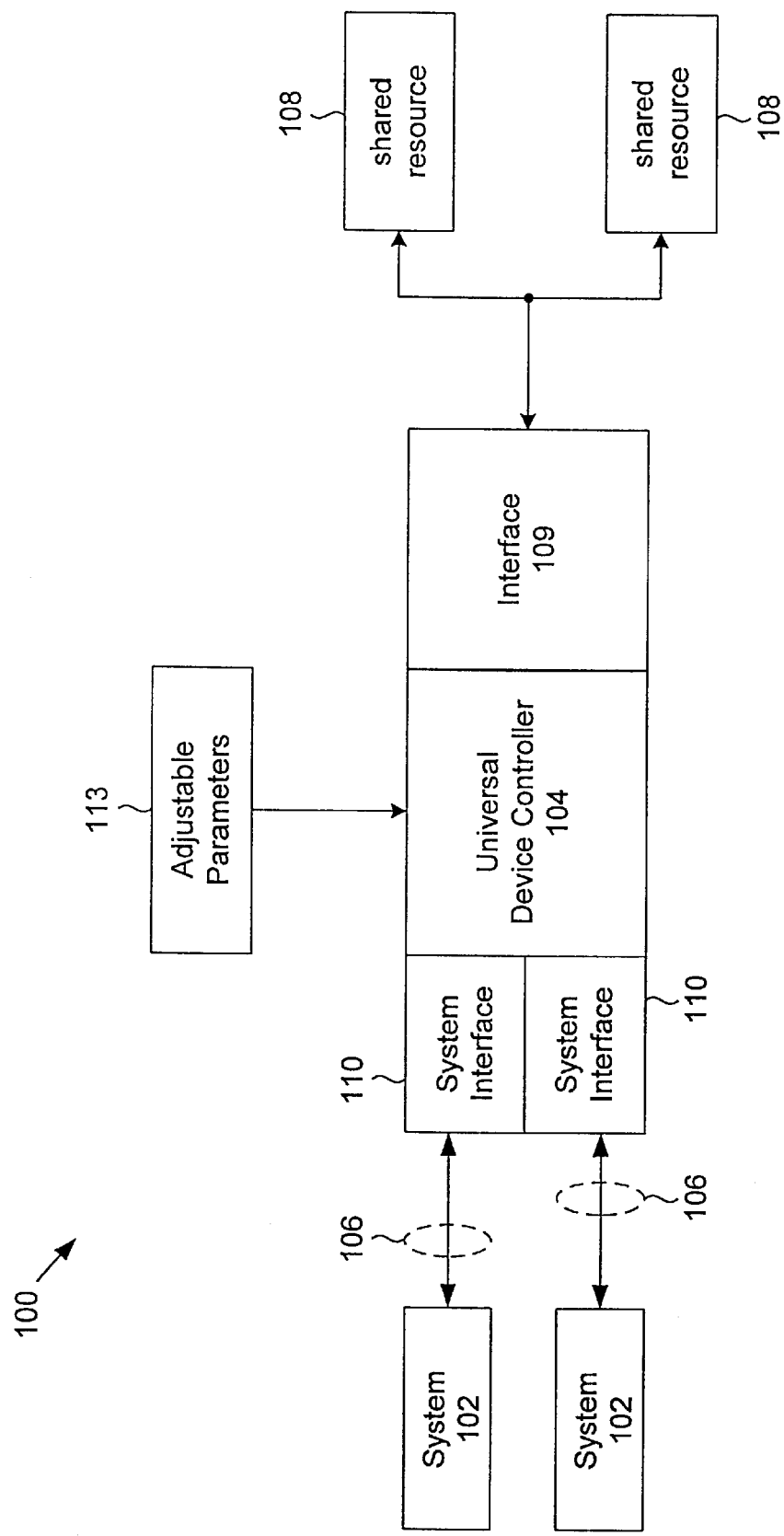
FIG. 1A illustrates a broad implementation of a universal controller in accordance with an embodiment of the invention.

Broadly speaking, as shown in FIG. 1A, the invention can be described in terms of a system 100 having requesting devices 102 each being coupled to a universal device controller 104 by way of a system bus 106 suitably configured to provide access to any number and type of shared resources 108. In one embodiment, the system bus 106 is coupled to the universal controller 104 by way of an associated system interface layer 110 whereas the universal controller 104, in turn, is coupled to the shared resource 108 by way of a shared resource interface 109. In broad terms, the universal controller 104 is arranged to determine a state of the shared resource 108 based upon both a shared resource request generated by any of the requesting systems 102 as well as shared resource operational characteristic parameters 113.

In those situations where the requesting system 102 is a processor in a multi-processor system that requires access to the shared resource 108 as a memory device 108 that is shared by other of the processors coupled thereto, the universal controller 104 determines a sequence of operations to be performed in order to complete the required resource request. When the memory device 108 is, for example, an SDRAM, the operations typically include a pre-charge, a page close, a page open, and a page read or a page write.

Once the particular sequence of operations has been determined, the universal controller 104 determines the appropriate timing between the sequence of operations in order to avoid, for example, data collisions or other type conflicts. In a preferred embodiment, the timing is based, in part, upon the operating characteristics of the shared memory device stored in, for example, a look up table. The properly sequenced access command is then issued by the universal controller that is then responded to by the shared memory.

In the following detailed description of the present invention, numerous specific embodiments are set forth in order to provide a thorough understanding of the invention. However, as will be apparent to those skilled in the art, the present invention may be practiced without these specific details or by using alternate elements or processes. In other instances well known processes, procedures, components, and circuits have not been described in detail so as not to unnecessarily obscure aspects of the present invention.

The invention will now be described in terms of a memory controller arranged to act as a liaison between a processor and a shared memory. It should be noted, however, that the invention can be implemented as a universal controller capable of controlling access to any resource, shared or not. Such resources do not necessarily have to be a memory, in fact, the invention could also be used to control access to a shared system bus such as, for example, providing traffic control in a multi-processor system so as to increase the effective system bus bandwidth by reducing bus access latency.

Figure 1B:
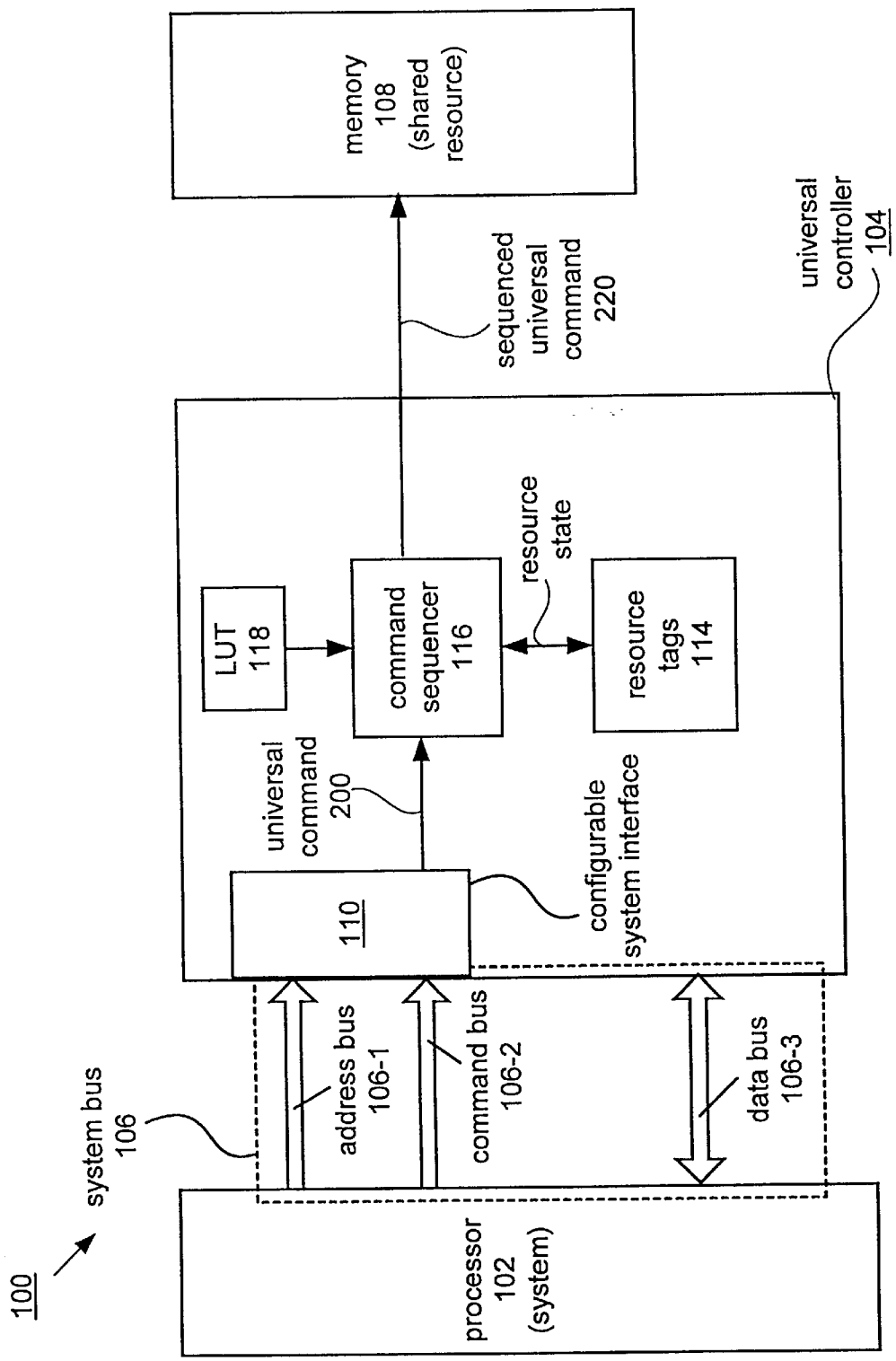
FIG. 1B illustrates a particular implementation of the universal controller shown in FIG. 1A.

Referring now to FIG. 1B, a system 100 has a requesting device 102, such as a processor, coupled to a universal controller 104 by way of a system bus 106. The controller 104 is, in turn, coupled to a shared resource 108 such as, for example, a memory 108 that can take many forms, such as a DRAM, an SDRAM, an SLDRAM EDO, FPM, RDRAM and the like. In the described embodiment, the system bus 106 includes a unidirectional address bus 106-1 arranged to pass memory address requests generated by the processor 102 to the universal controller 104. The system bus 106 also includes a uni-directional command bus 106-2 which, in conjunction with the address bus 106-1, carries a command associated with the memory address. For example, when the processor 102 requires an executable instruction stored at a particular memory location in the memory 108, the processor outputs a read request (referred to as a system command) to the command bus 106-2 substantially simultaneously with a corresponding memory address request (referred to as a system address) on the address bus 106-1. Both the system address and system command are received by a configurable system interface 110 included in the controller 104. It should be noted that by configurable, it is meant that the system interface 110 can be arranged to process the received system command and address in whatever manner and form is required by the memory 108. In this way, data required by the processor 102 can be stored in any number and kinds of memory devices coupled to the controller 104 without the processor 102 being required to generate customized requests for each memory device.

Figure 2A:
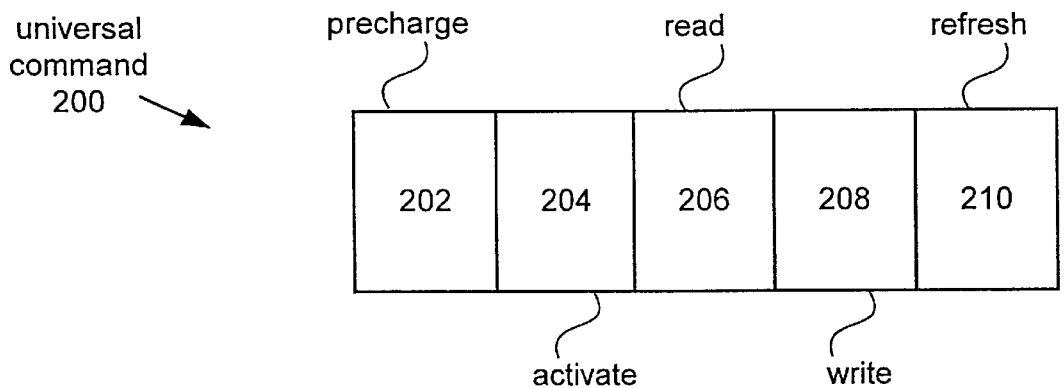
FIG. 2A illustrates a generic universal command in accordance with an embodiment of the invention.
Figure 2B:
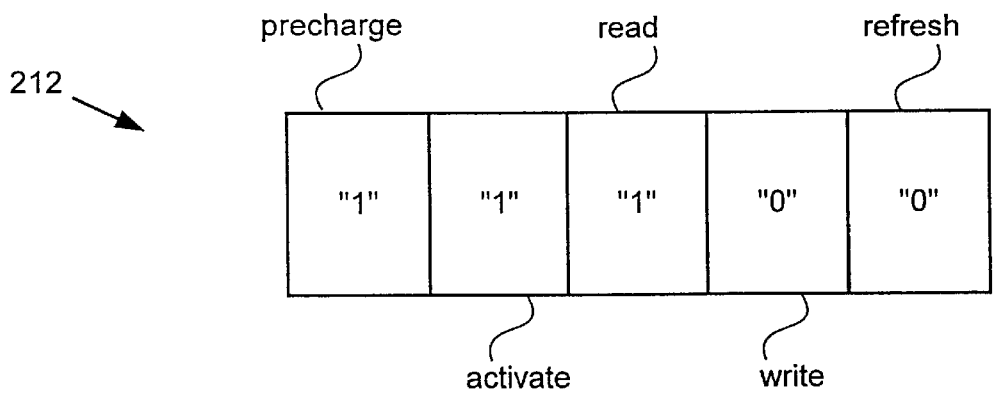
FIG. 2B illustrates a particular universal command of the kind shown in FIG. 2A suitable for requesting memory page read command.

In the described embodiment, the system interface 110 is arranged to convert the received system command and system address to what is referred to as a universal command 200, an example of which is shown in FIG. 2A. In one implementation, when the shared resource is a DRAM type memory device (including SLDRAMs, SDRAM, EDO DRAM, etc.) the universal command 200 is formed of 5 data fields which encompass all the operations required in order to perform any memory access of the memory 108. Such operations include a pre-charge operation identified by a pre-charge data field 202 used to indicate whether or not a particular row should be pre-charged. Other operations include an activate data field 204, a read data field 206, a write data field 208, and a refresh data field 210. If, for example, in the case where the memory 208 has a memory page 1 of memory bank 1 currently active (i.e., open after having been read from or written to), and a subsequent processor command then requires that data stored on a page 2 of the memory bank 1 be read and output to the processor 102. In this case, in order to carry out the requested command by the processor 102, the page 1 has to be closed (i.e., page 1 is pre-charged), and page 2 has to be activated, and after the activation is complete, the page 2 is read. Therefor, the universal command 212 shown in FIG. 2B, is generated by the universal command generator 110 having the data fields 202, 204 and 206 set to "1" to indicate "perform the associated operation" while data fields 208 and 210 set to "0" indicating "do not perform the associated operation" (i.e., "NOP").

Figure 3A:
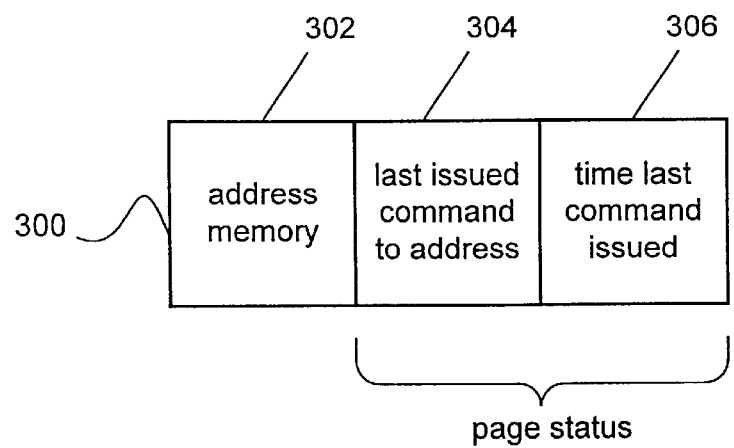
FIG. 3 illustrates a resource tag in accordance with an embodiment of the invention.
Figure 3B:
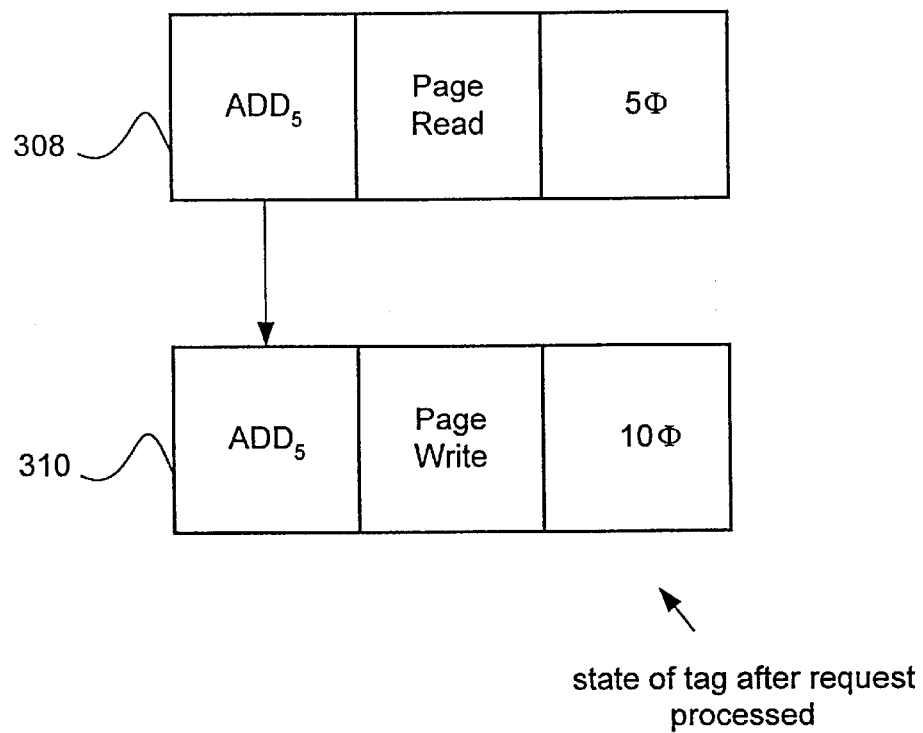

Referring back to FIG. 1B, since the accessing of the memory 108 is dynamic in nature in that a number of different requesting devices are sharing access to the memory 108, the state of the memory 108 is constantly changing. By state of the memory, it is meant that in order to successfully perform a particular operation at a particular memory location, the state of that memory location must be known. For example, if a particular memory page is closed, then in order to perform a read operation, that memory page must be opened. Therefor, in order to ascertain the current state of a particular address location, the most current operation that has been performed on that particular memory location is identified with a resource tag 300 as illustrated in FIG. 3. In one embodiment of the invention, the resource tag 300 includes an address field 302 used to identify a particular memory address location, a last issued command field 304 used to identify the last issued command for the address identified in 302 as well as a time of last command data field 306. For example, a resource tag 308 for a memory address $ADD_5$ indicates that a page read was issued at a time 5N (representative of 5 system clock cycles) where while a resource tag 310 indicates that for the same memory address $ADD_5$ a page write is to be performed on the memory page at $ADD_5$ at a time 10N. By tracking the state of the memory address $ADD_5$ the universal controller 104 knows that the memory page at $ADD_5$ is already open and a page open operation is therefor not required.

Figure 2C:
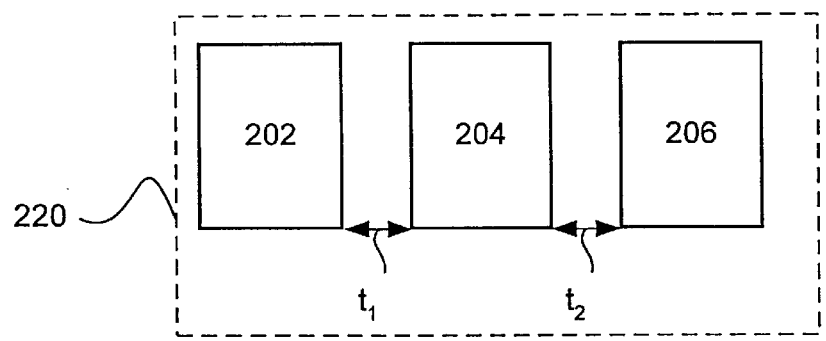
FIG. 2C shows an example of a sequence command formed by providing appropriate timing intervals between the command components of the exemplary command shown in FIG. 2B.

Using the resource state information provided by the tags 300 stored in a resource tag buffer 114, a command sequencer 114 coupled to the configurable system interface 112 provides appropriate timing intervals between the command components 202–210 of the universal command 200 to provide a sequenced command 220 illustrated in FIG. 2C having timing intervals $t_1$ and $t_2$ between the command components 202–204 and 204–206, respectively. It should be noted that since there command components 208 and 210 are "NOP" type fields, the sequenced command 220 does not include any reference to these fields and as such only requires a period of time substantially equal to clock cycles required for the components 202 through 206 plus the period of time substantially equal to $t_1+t_2$. In this way, the command sequencer 114 is able to provide optimal command and data flow between the processor 102 and the memory 108.

In another embodiment of the invention, when the shared resource 108 is a multi-bank type memory device, such as a SDRAM, or when the shared resource is a multi-device memory device such as a multi-chip module, the resource tag buffer 114 can store resource tags for all opened pages in a particular bank or device, for example. In one implementation, a comparator (not shown) detects a bank number or device identifier in the system address and compares the page address and the system address with the contents of the tag buffer 114. In the case where the comparison is not a "hit"(i.e., addresses don't match), the universal controller 104 must close the old page using the address from the tag buffer 114 and open the new page based upon the new system command.

Figure 1C:
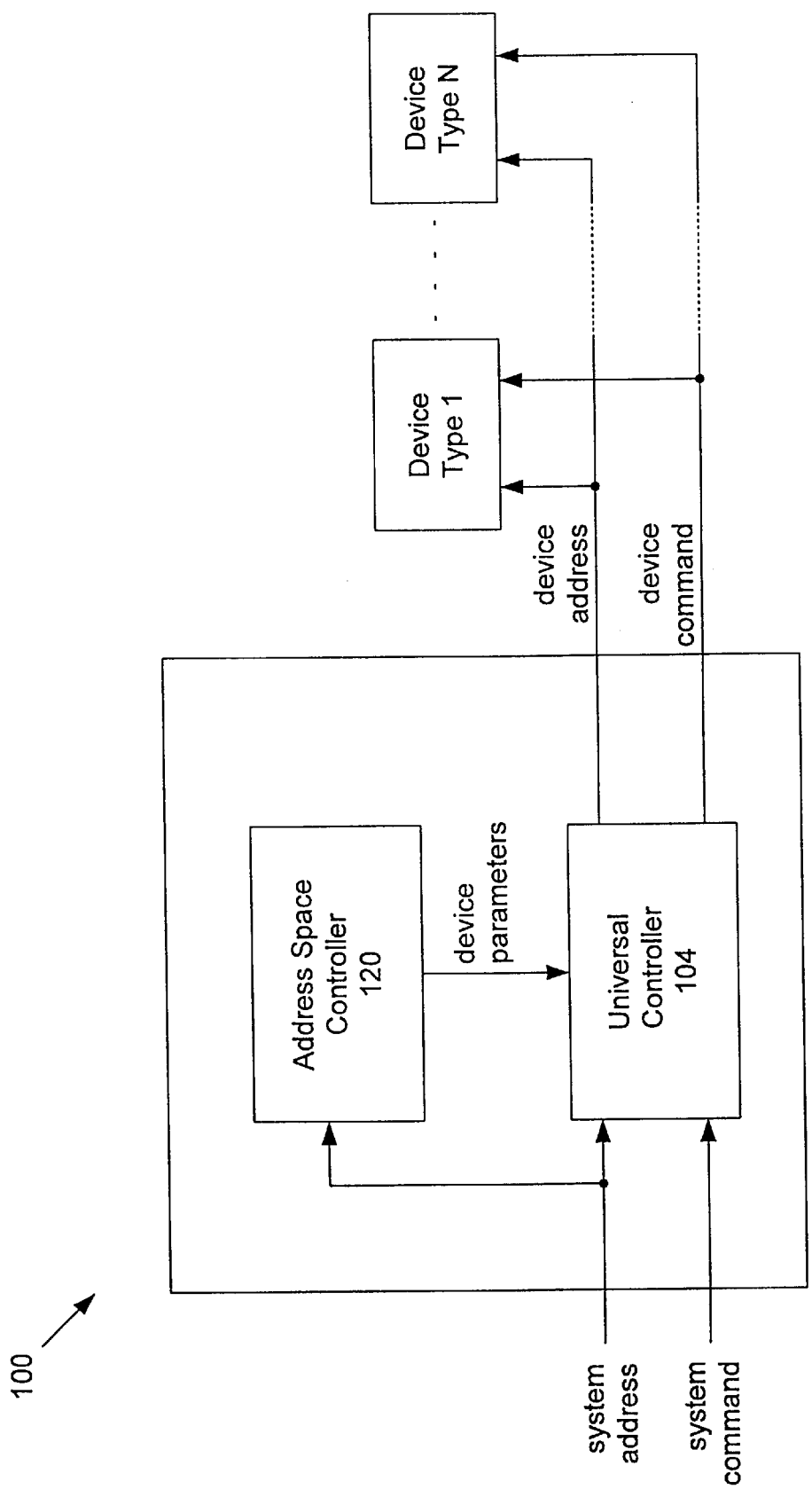
FIG. 1C shows an address space controller coupled to the universal controller is in accordance with an embodiment of the invention.
Figure 1D:
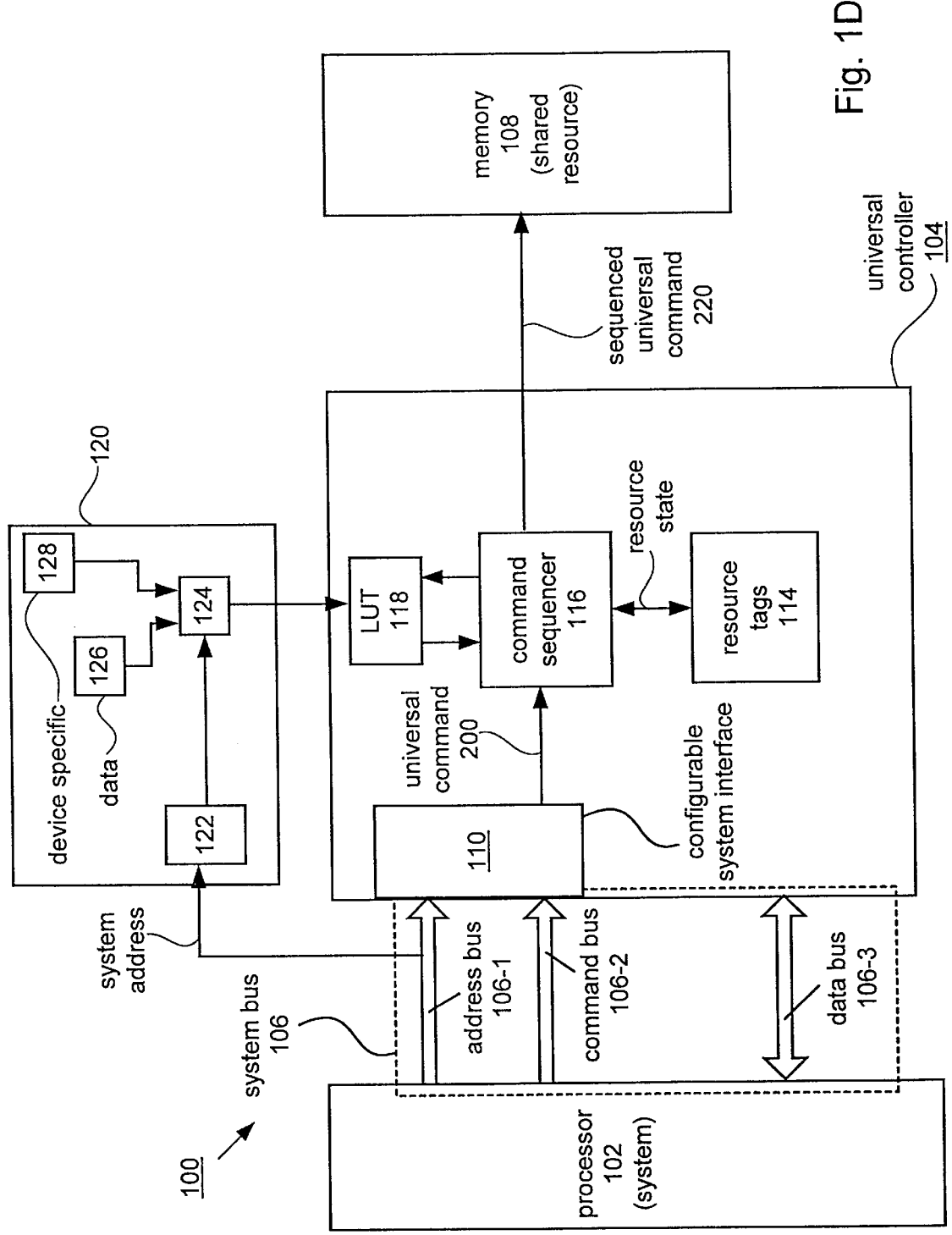
FIG. 1D illustrates a particular implementation of the address space controller shown in FIG. 1C.

In those cases where there are a number of different devices being serviced by the universal controller 104, it would be desirable to be able to select those operating parameters associated only with the particular device with which the incoming system address is associated. In situations where the universal controller is servicing a number of different devices, an address space controller 120 coupled to the universal controller 104 is shown with reference to FIG. 1C. In the described embodiment, the address space controller 120 provides for the capability of selecting only those device specific parameters for the one device associated with the incoming system address. In a particular implementation, shown in FIG. 1D, the address space controller 120 includes a comparator 122 arranged to compare the incoming system address to the contents a region address range buffer 124 that identifies which of the devices (or for that matter, memory regions) the incoming address is associated. Once the particular device, or region, is identified, one of a group of device parameter registers 126 and 128 (each being coupled to the range buffer 124 and containing the device specific parameters for a particular device) is selected. The selected device parameter register then provides the specific operating parameters associated with the device corresponding to the system address. In some embodiments, the contents of the selected device parameter register is input to the LUT 118. In this way, any number of different devices can be serviced by the universal controller 104 such that each device's particular operating parameters are identified and used to optimally sequence the corresponding universal command.

It should also be noted that in some cases one of the devices coupled to the universal controller is busy and cannot accept new commands, it would be advantageous to be able to select any other of the commands waiting in a command queue. In some embodiments of the invention, every response by the devices and requests by the universal controller have an associated ID number 150 which in the described embodiment is a data word of 5 bits in length as illustrated in FIG. 1E. The ID number 150 is configured to include a group selector field 152 of 2 bits in length and a request number field 153 of 3 bits in length. The group selector (GS) determines to which group the particular system request belongs (i.e., the processor, for example) while the request number (RN) represents the number of requests or responses with the associated group identified by the group selector field 152 such that consecutive requests from the same transceiver have consecutive request numbers.

In some embodiments, a group priority selector register 154 includes priority values for each of the response or request groups such that a response or request group having a higher priority will supercede that of a lower priority. In this way, a response or request with a higher priority can bypass that of a lower priority when the lower priority request or response cannot be processed in the next clock cycle. In order to prevent what is referred to as livelock, a livelock counter register 156 contains information about the number of consecutive requests (or responses) with the higher priority can bypass requests (or responses) with a lower priority. In this way, the lower priority request (or response) can not be starved for a substantial number of clock cycles.

It should be noted as well that in order to optimize the control of both command and data flow, it is recognized that each shared resource has associated with it a set of operating characteristics (such as access time, CAS latency in the case of DRAM type devices, for example). In those cases where more than one shared resource is serviced by the universal controller 104, each of the shared resources has a different set of operating characteristics which are, in some embodiments, stored in a look-up table (LUT) 118 coupled to the command sequencer 116. The command sequencer 116 uses the information provided by the LUT 118 in conjunction with the resource tags stored in the resource tag buffer 114 to properly sequence the command components 202–210 to form the sequenced command 220. This is especially true in cases where the shared resource is in fact a group of memory devices, such as a multi-chip module, in which each device can have substantially different operating characteristics.

Figure 4:
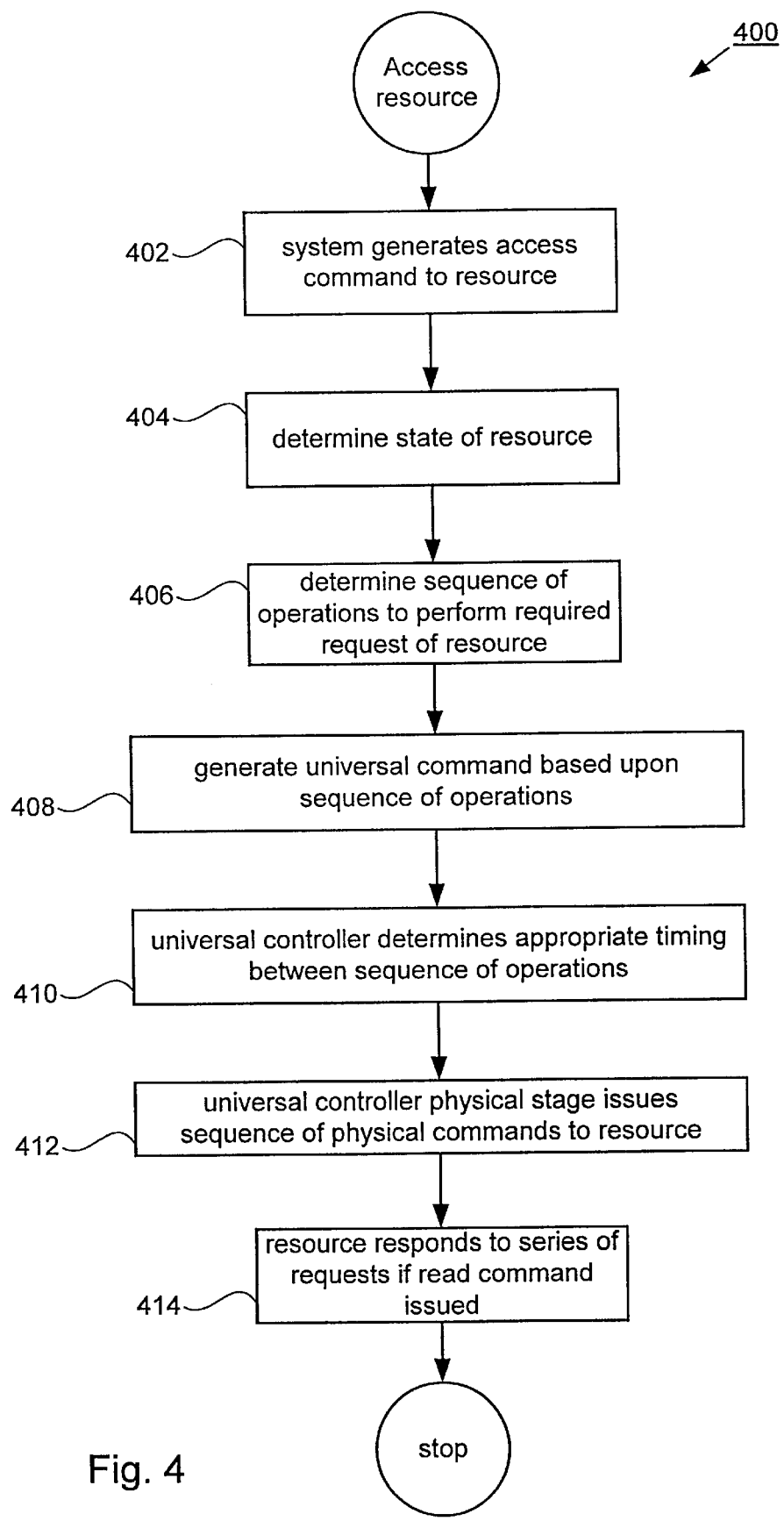
FIG. 4 shows a flowchart detailing a process for a universal controller to access a shared resource in accordance with an embodiment of the invention.

Referring now to FIG. 4, a flowchart detailing a process 400 for a universal controller to access a shared resource in accordance with an embodiment of the invention is shown. The process 400 begins at 402 by the system generating an access command for the shared resource. When the shared resource is a DRAM based memory device, such operations include pre-charge, refresh, close, open, read, and write. For example, a processor requests a memory page stored in a shared memory by generating a system command (i.e., page read) and an associated system address indicating the location in the memory where the requested page is stored. In a preferred embodiment, the state of the resource is determined at 404 using, for example, resource tags associated with active memory locations in the shared memory. Next, at 406, a determination is made of a sequence of operations required in order to perform the required request of the shared resource. At 408, the universal controller generates a universal command that is based upon the sequence of operations required to perform the required request. For example, in order to perform a page read operation, a previously open page must be closed, the new page activated, and the read operation performed, all of which are comprehended in the single universal command structure. Once the universal command has be constructed by the universal controller, using resource tags and specific operating characteristic data for the shared resource, the universal controller then determines the appropriate timing between the various command components of the universal command at 410. The sequenced command is then issued at 412, using in some embodiments a physical stage, to the shared resource. Finally, at 414, the shared resource responds to the sequenced command by, for example, providing data stored in the location indicated by the system address.

Figure 5:
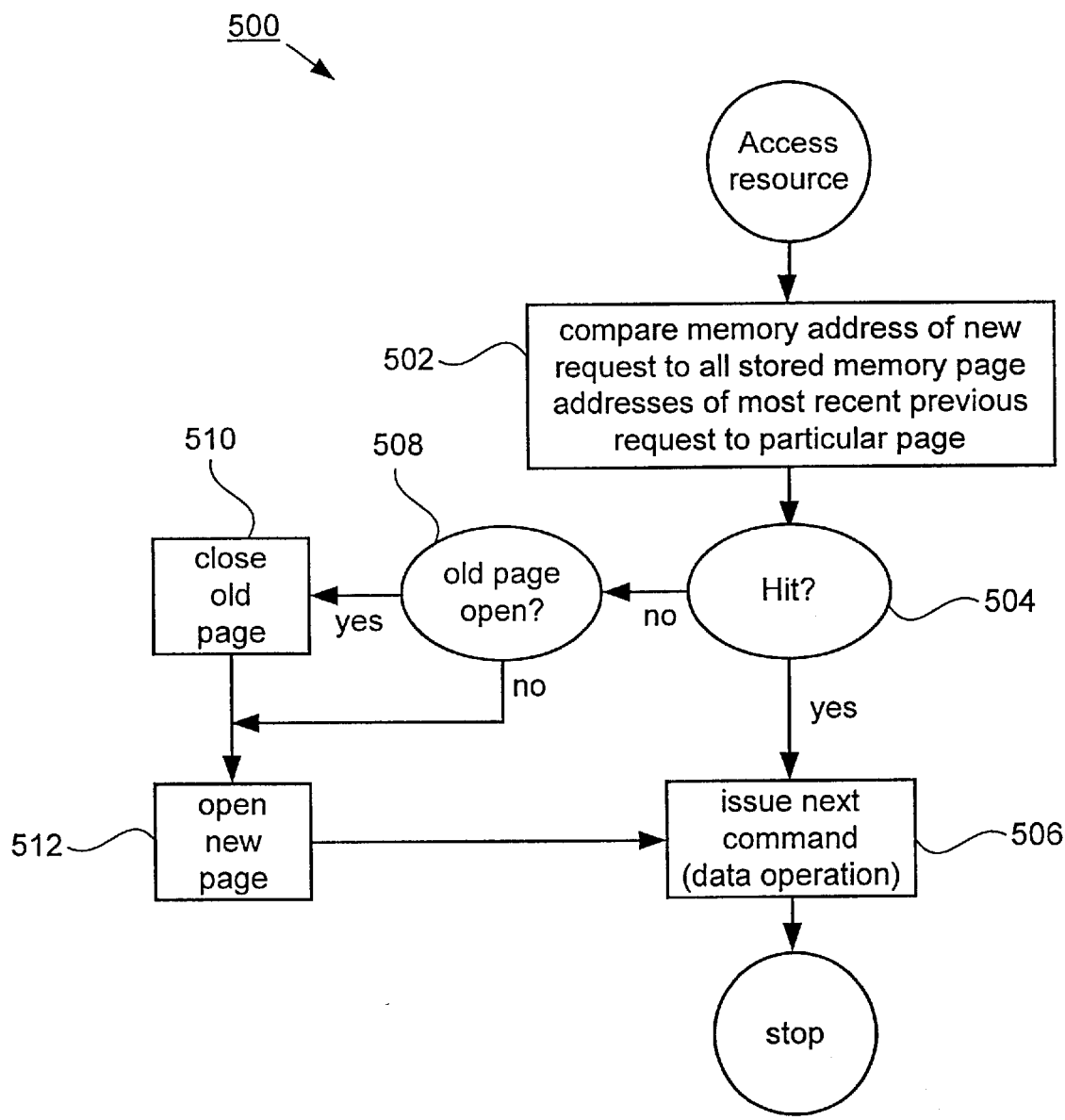
FIG. 5 shows a process whereby the universal controller determines the state of the resource and the sequence of operations to perform in accordance with an embodiment of the invention.

In one embodiment of the invention, the universal controller determines the state of the resource (402) and the sequence of operations to perform (404) using a process 500 shown in FIG. 5. The process 500 begins at 502 by a resource partition identifier (i.e., memory address register) being compared to a resource identifier (i.e., resource tag address field 202). If, at 504, it is determined that a "hit" has occurred (i.e., the address of the new command matches the current tag address field), then the next command (data operation) is issued at 506. On the other hand, if the address of the new command does not match the current tag address field (i.e., no hit), then at 508 a determination is made whether or not the old page is open. If the old page is open, then the old page is closed at 510 and the new page is opened at 512. If, however, at 508 the old page is not open, then the new page is opened at 512 and in either case, once the new page is opened, the next command (data operation) is issued at 506.

Figure 6:
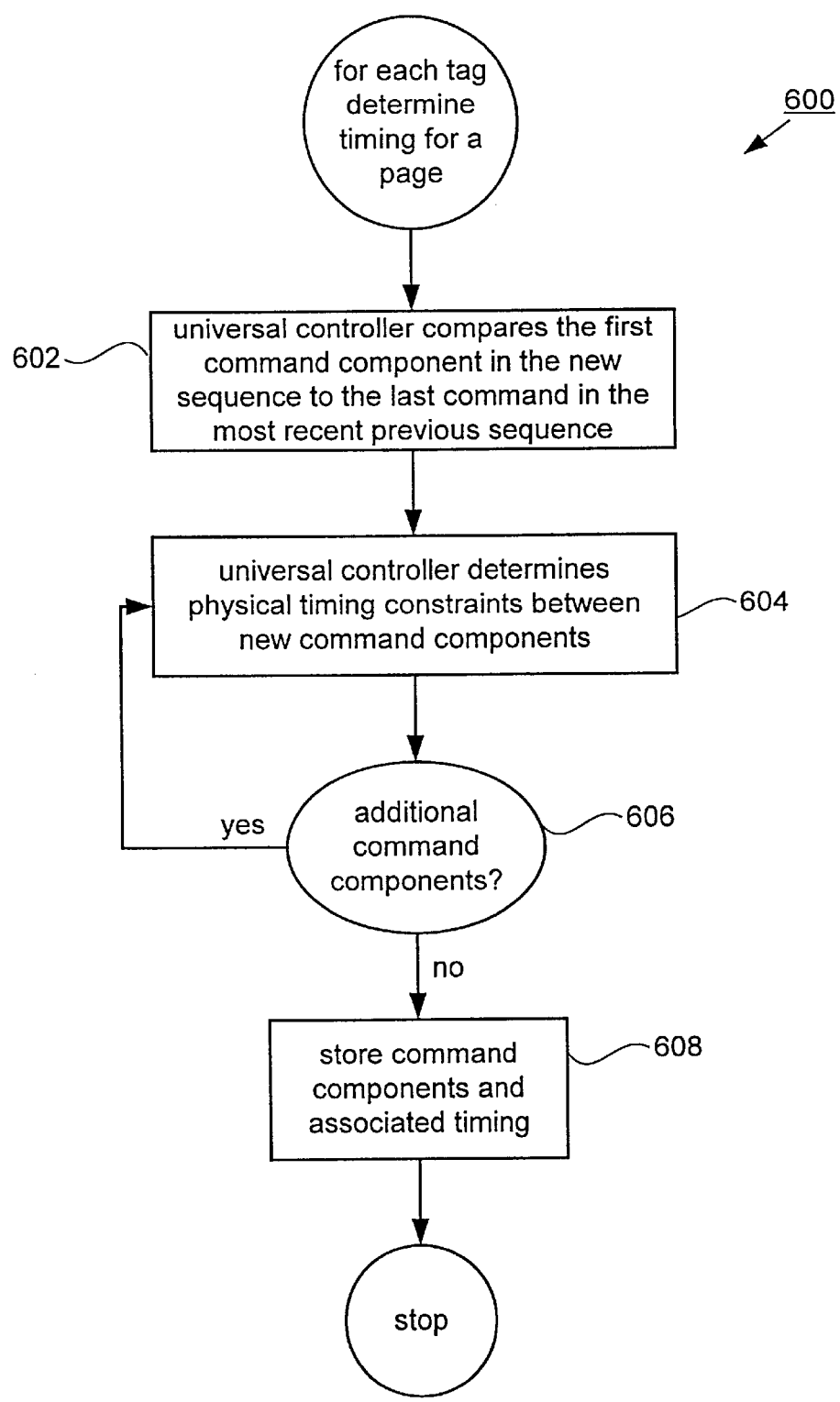
FIG. 6 shows a process whereby the universal controller determines the appropriate timing between the sequence of operations based upon a process in accordance with an embodiment of the invention.

In one embodiment of the invention, the universal controller determines the appropriate timing between the sequence of operations (410) based upon a process 600 shown in FIG. 6. The process 600 begins at 602 by the universal controller comparing the first command in the new sequence of commands to the last command in the most recent previous sequence of commands for a particular resource. At 604, the universal controller determines the timing constraints between the universal command components by comparing the first command component of the new universal command with the last command component of the most recent previous universal command. In one embodiment, the universal controller uses a 2 index lookup table (LUT) in the form of a two dimensional array shown as TABLE 1 where a first row of the array represents the old (i.e., most recent previous) command and a first column represents the new command. For example, referring to TABLE 1, if the old command was a page read and if the new command is a page close, then the intersection of the new command page close and the old command page read (i.e., 5N) provides the minimum allowable amount of time (i.e., minimum physical issue time) between the two operations.

Typically, the information stored in a LUT is provided by the shared resource manufacturer.

TABLE 1

| NEW COMMAND | OLD COMMAND | | | |
|---|---|---|---|---|
| | page close | page open | Read | Write |
| page close | | | 5 N | |
| page open | | | | |
| Read | | | | |
| Write | | | | |

Once the physical constraints of the resource are determined for a particular universal command component, a determination is made at 606 whether or not there are additional command components included in the universal command. If there are no additional command components, then the universal command and the associated component timing specifications are stored at 608. On the other hand, if there are additional command components included in the universal command, then control is passed back to 604 where the corresponding physical timing constraints for that component is determined.

Figure 7A:
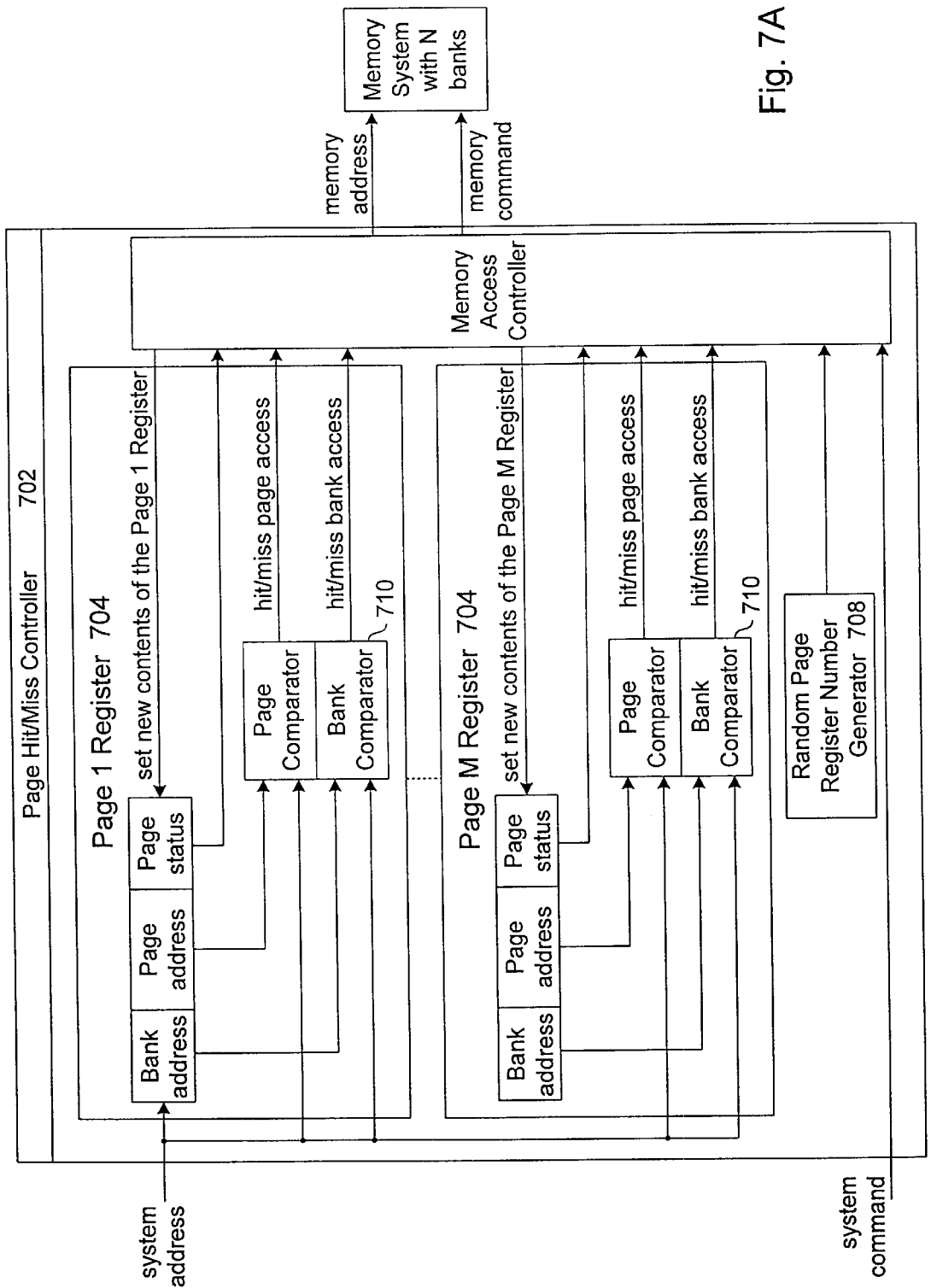
FIGS. 7A–7B shows a page hit/miss controller in accordance with an embodiment of the invention.

However, in order to track a state of the physical pages in the shared memory 108 having a number of memory banks, for example, a large number of resource tags which would require a large amount of cache memory dedicated to the resource tag buffer 114. This would slow the performance of the universal controller 104 since it would require substantial amounts of time to retrieve particular resource tags for particular pages of memory each of which may be located in disparate locations. Referring to FIG. 7A, in one embodiment, a page hit/miss controller 702 is included in the universal controller 104 arranged to reduce the number M of page registers 704 smaller than the number N of memory banks in a multi-bank memory 706 since not every bank has its representation in the M page registers 704. In operation, each of the M page registers 704 stores address and status data of an open page and a random page register number generator 708 generates a random integral number less than or equal M corresponding to the page register that has to be replaced by the status of an open page. A comparator 710 compares an incoming system address with the bank number and the page address of all the M registers in parallel with four possible results.

1) If the comparator 710 indicates a hit, then the required page of the requested bank is open and ready to access;
2) If the comparator 710 indicates that there is a bank hit and a page miss, then the universal controller 104 must close the old page using the page address from the page register and open a new page using the page address from the system address;
3) If the comparator 710 indicates a bank and a page miss, the universal controller 104 must close any old page of the bank which number is given by the random page number generator, open a new page using the system address and finally accessing the requested bank; and
4) bank and page miss, but at least one page register is unused then this register will be used and new page will be opened.

Figure 7B:
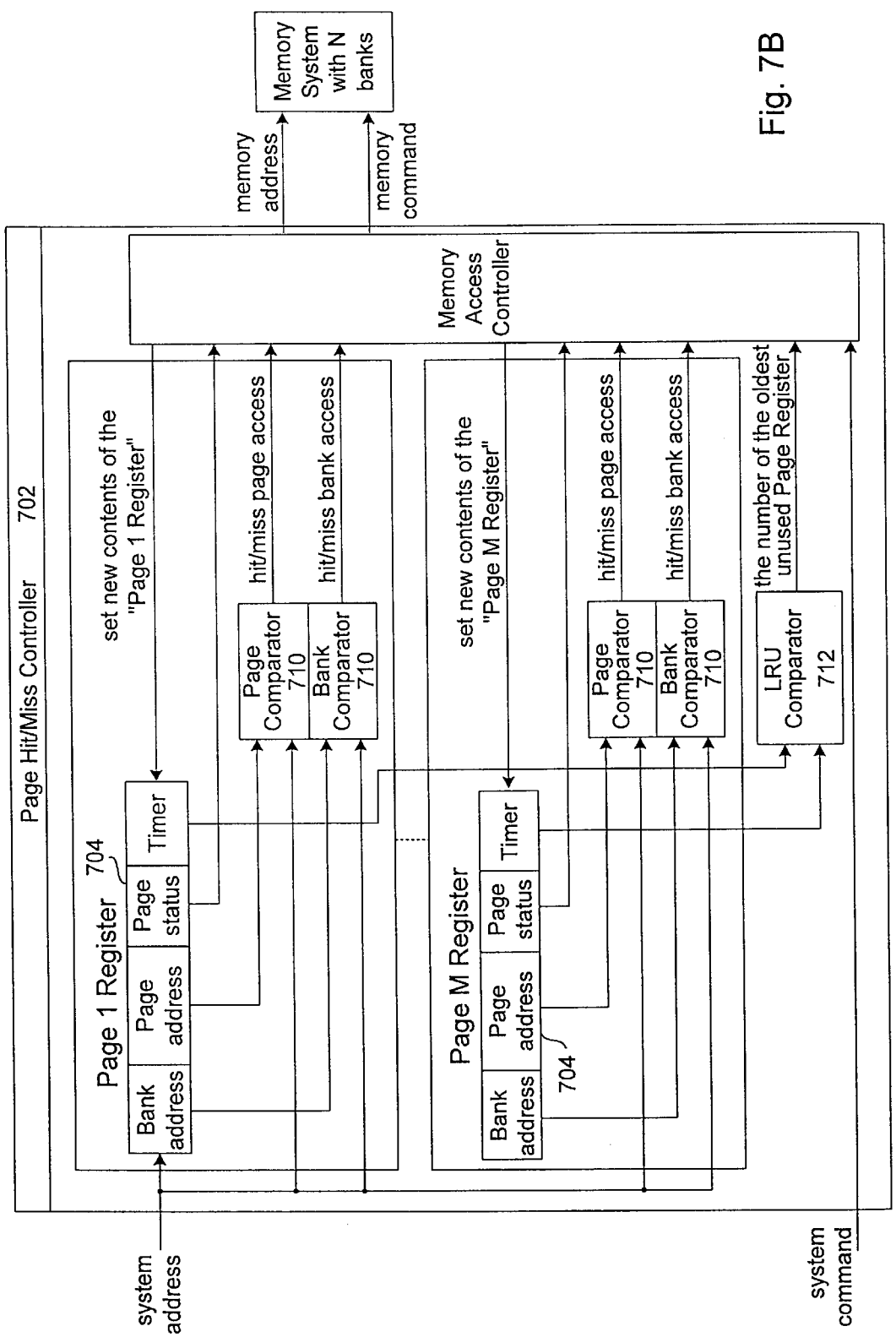

In some embodiments, the random number page generator 708 is replaced by a Least Recently Used (LRU) comparator 712 as shown in FIG. 7B determines which of the M registers 704 has been unused the longest amount of time (i.e., least recently used).

Figure 8:
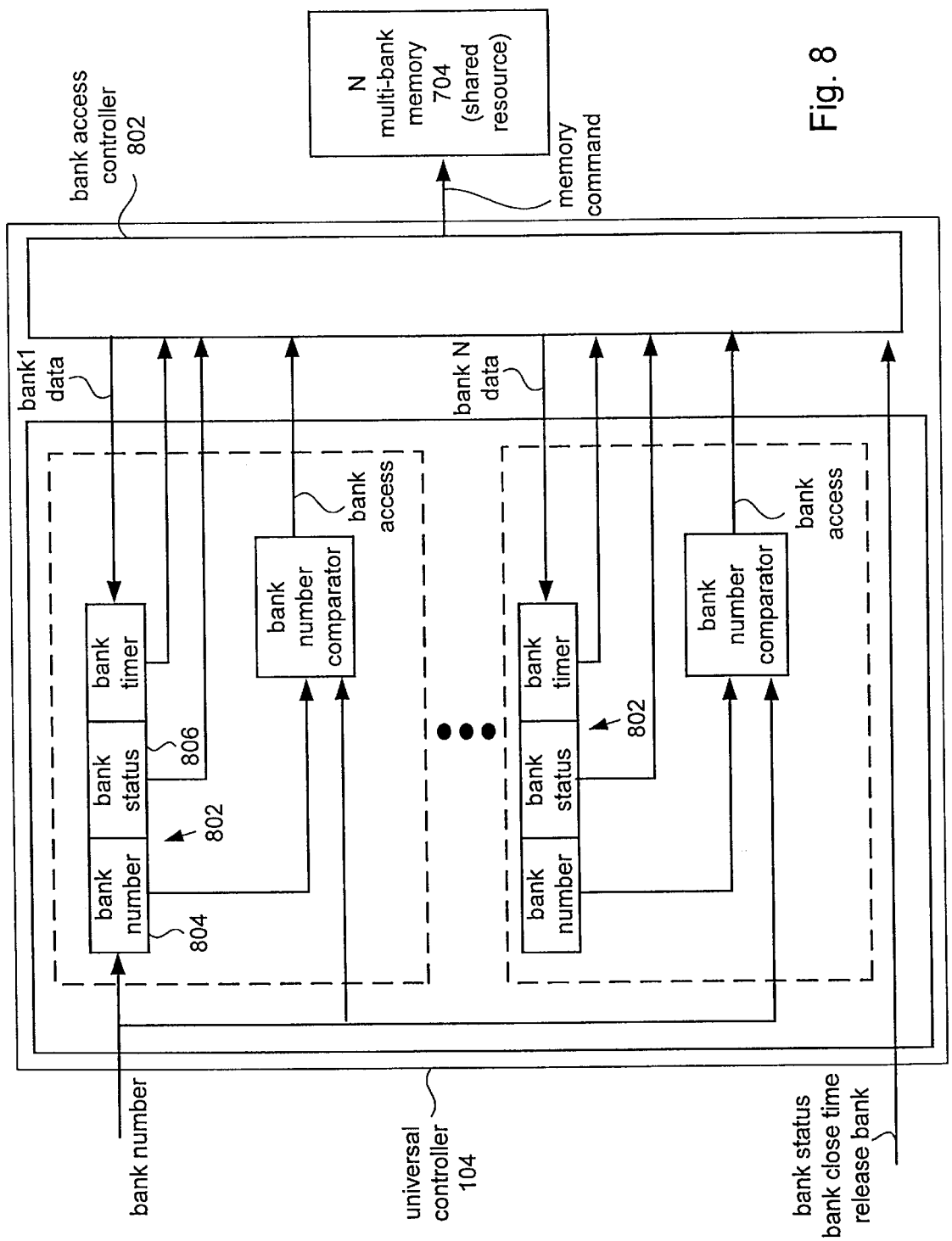
FIG. 8 shows a bank access controller in accordance with an embodiment of the invention.

In addition to tracking the states of the physical pages in the multi-bank memory 704, a bank access controller 800 shown in FIG. 8 includes N bank registers 802 corresponding to the number of memory banks N included in the multi-bank memory 704. The bank register 802 includes a bank number field 804 that defines an identifying number of the bank for which the information in the associated bank is stored. The bank register 802 also includes a bank status field 806 indicating the status of the particular bank identified by the bank number in the bank number field 804. In a particular embodiment, the bank status field 806 can take on values such as those presented in Table 2.

TABLE 2

| Bank Register Elements | Description |
| --- | --- |
| Bank Number | Identifies bank for which the information in bank register is stored |
| Bank Status | Indicates status of bank:<br>"00" - invalid entry<br>"01" - the bank counter value is decreased unit its value reaches 0. If bank counter is greater than 0, access to this bank are prohibited.<br>"10" - the bank is closed.<br>"01" - the bank counter value is decreased until it reaches 0. if bank counter is greater than 0, then accesses to all banks in the memory are prohibited |
| Bank Timer | If bank counter is greater than 0, then the accesses to memory according to the bank status value are prohibited. |

Figure 9A:
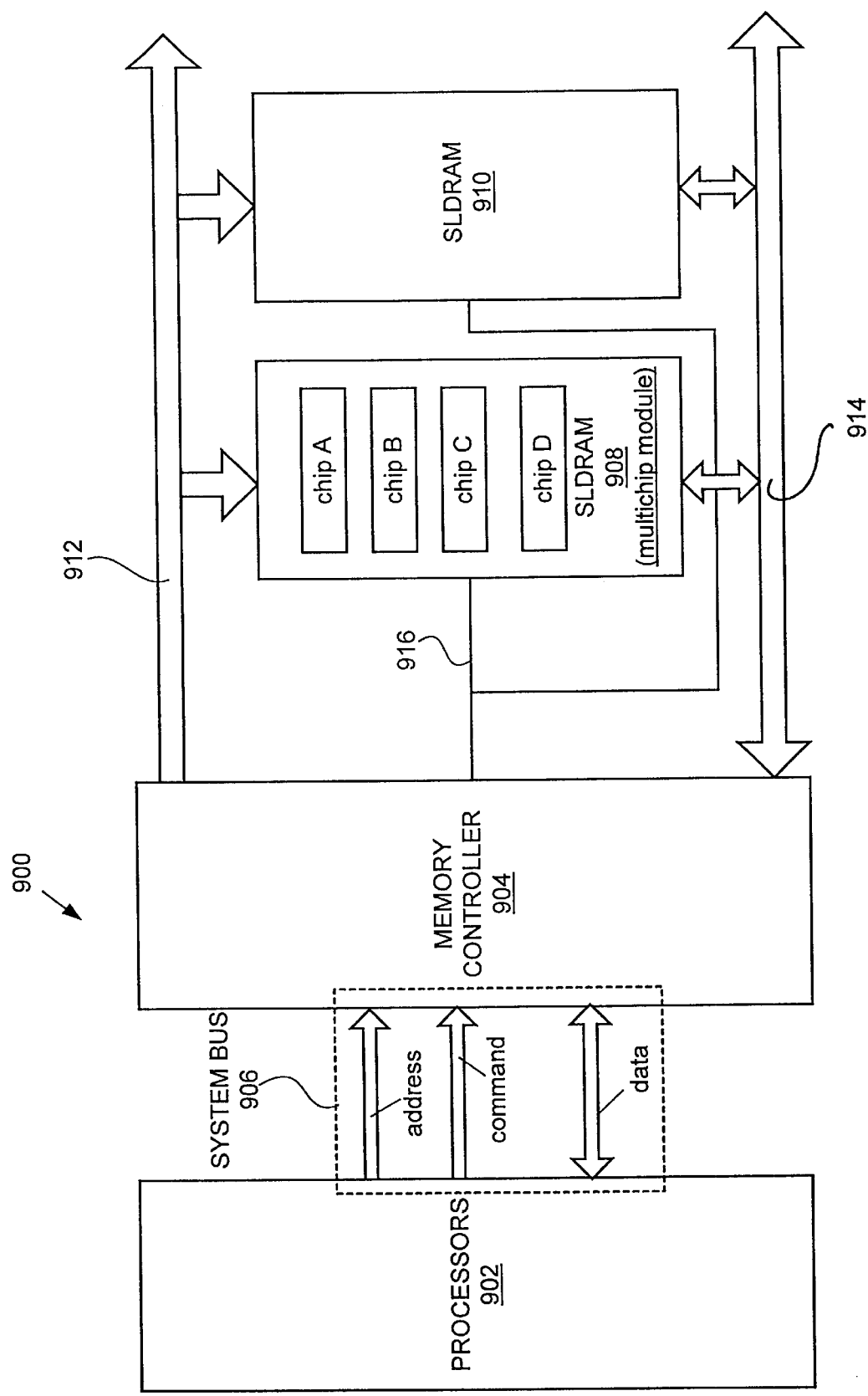
FIG. 9A is an exemplary SLDRAM based multi-processor system in accordance with an embodiment of the invention.

With the development of high speed packet oriented memories such as synchronous link dynamic random access memory (SLDRAM) that deliver bus data rates in the range of 400 to 800 Mb/s/pin, the problems caused by memory access conflicts are greatly increased. Referring initially to FIG. 9A, an exemplary SLDRAM based multi-processor system 900 in accordance with an embodiment of the invention is shown. The multi-processor system 900 includes processors 902 connected to a controller 904 by way of a system bus 906. The universal controller 904, in turn, is connected to synchronous link DRAM (SLDRAM) 908 and SLDRAM 910 by way of a SLDRAM bus composed of a uni-directional command bus 912 and a bi-directional data bus 914. It should be noted that even though only two SLDRAMs is shown in FIG. 9A, any number of SLDRAMs can be connected to the universal controller 904 by way of the busses 912 and 914. In some cases, the SLDRAMs can take the form of a buffered module that includes any appropriate number of SLDRAMs such as, for this discussion, the SLDRAM 908. An initialization/synchronization (I/S) bus 916 connecting the universal controller 904 to each of the SLDRAMs 908 and 910 provides a signal path for initialization signals as well as synchronization signals generated by the universal controller 904.

In one embodiment of the invention, packetized command, address, and control information from the universal controller 904 are selectively sent to the SLDRAM 908 and SLDRAM 910 on the command bus 912. The data bus 914 is arranged to transmit packetized write data from the universal controller 904 to selected ones of the SLDRAM 908 and SLDRAM 910. Alternatively, the data bus 914 is also configured to transmit packetized read data from selected ones of the SLDRAM 908 and SLDRAM 910 back to the universal controller 904. It should be noted that the command bus 912 and the data bus 914 typically operate at the same rate, i.e. 400 MB/s/p, 600 MB/s/p, 800 MB/p/s, etc.

A number of control signals generated by the universal controller 904 and carried by the command bus 912 include, for example, a differential free running clock signal (CCLK), a FLAG signal, a command address signal CA, a LISTEN signal, a LINKON signal, and a RESET signal. Typically, packet commands are formed of 4 consecutive 10-bit words where the first word of a command is indicated by a '1' in the first bit of the FLAG signal. In a preferred embodiment, both edges of the differential free running clock CCLK are used by the SLDRAM 908 and 910 to latch command words. The SLDRAM 908 and 910 respond to the LISTEN signal being HIGH by monitoring the command bus 912 for incoming commands. Alternatively, the SLDRAM 908 and 910 respond to the LISTEN signal being LOW by entering a power saving standby mode. The LINKON signal and RESET signals are used to, respectively, shutdown and power up to a known state selected ones of the SLDRAM 908 and 910, as desired.

For the remainder of this discussion, the SLDRAM 908 only will be discussed with the full knowledge, however, that any number of SLDRAMs can be connected to the universal controller 904 as deemed appropriate. As discussed above, a typical SLDRAM device, such as the SLDRAM 908, is hierarchically organized by memory banks, columns, rows, and bits as well as into regions of memory. It is important to note that each of these hierarchical levels can in fact be observed to have different operational characteristics from one another. Such operational characteristics include, but are not limited to such parameters as memory access time, chip enable time, data retrieval time etc. It should be noted that the banks within the multi-bank memory will typically have the same operational characteristics whereas regions are defined to be different devices, such as different memory types or different memory groups each having different command and data latencies. For example, a local memory group can be connected directly to the memory controller and a second, non-local memory group located on a board where intervening drivers increase command and data latencies with respect to the local memory group. In other cases, each of the various memory chips that go to form a multi-chip module can be considered to be a different memory region.

More specifically with reference to the system of FIG. 9A, the SLDRAM 908 is a multichip module having 4 memory chips, A, B, C, and D each capable of being individually accessed by the command bus 912, the data bus 914, and the I/S bus 916. Since each of the memory chips A–D can have different operational characteristics (typically supplied by the manufacturer), in order to optimally schedule command any other format as may be determined as appropriate. During power up, the universal controller 904 organizes the command packet based upon polling of the SLDRAMs for such factors as the number of banks, rows, columns, and associated operating characteristics which is then stored by the universal controller 904.

The first word of the command packet contains the chip ID bits. An SLDRAM will ignore any command that does not match the local ID. Chip ID is assigned by the universal controller 904 on power-up using the initialization and synchronization signals. In this way, the universal controller 904 uniquely addresses each SLDRAM in the multi-processor system 900 with resorting to generating separate chip enable signals or glue logic.

TABLE 3

SLDRAM COMMAND PACKET STRUCTURE

| FLAG | CA9 | CA8 | CA7 | CA6 | CA5 | CA4 | CA3 | CA2 | CA1 | CA0 |
|---|---|---|---|---|---|---|---|---|---|---|
| 1 | ID8 | ID7 | ID6 | ID5 | ID4 | ID3 | ID2 | ID1 | ID0 | CMD5 |
| 0 | CMD4 | CMD3 | CMD2 | CMD1 | CMD0 | BNK2 | BNK1 | BNK0 | RW9 | RW8 |
| 0 | ROW7 | ROW6 | ROW5 | ROW4 | ROW3 | ROW2 | ROW1 | ROW0 | 0 | 0 |
| 0 | 0 | 0 | 0 | COL6 | COL5 | COL4 | COL3 | COL2 | COL1 | COL0 | and data packets, the universal controller 904 is capable of using the operational characteristics of a particular hierarchical level and/or memory regions accordingly.

Figure 9B:
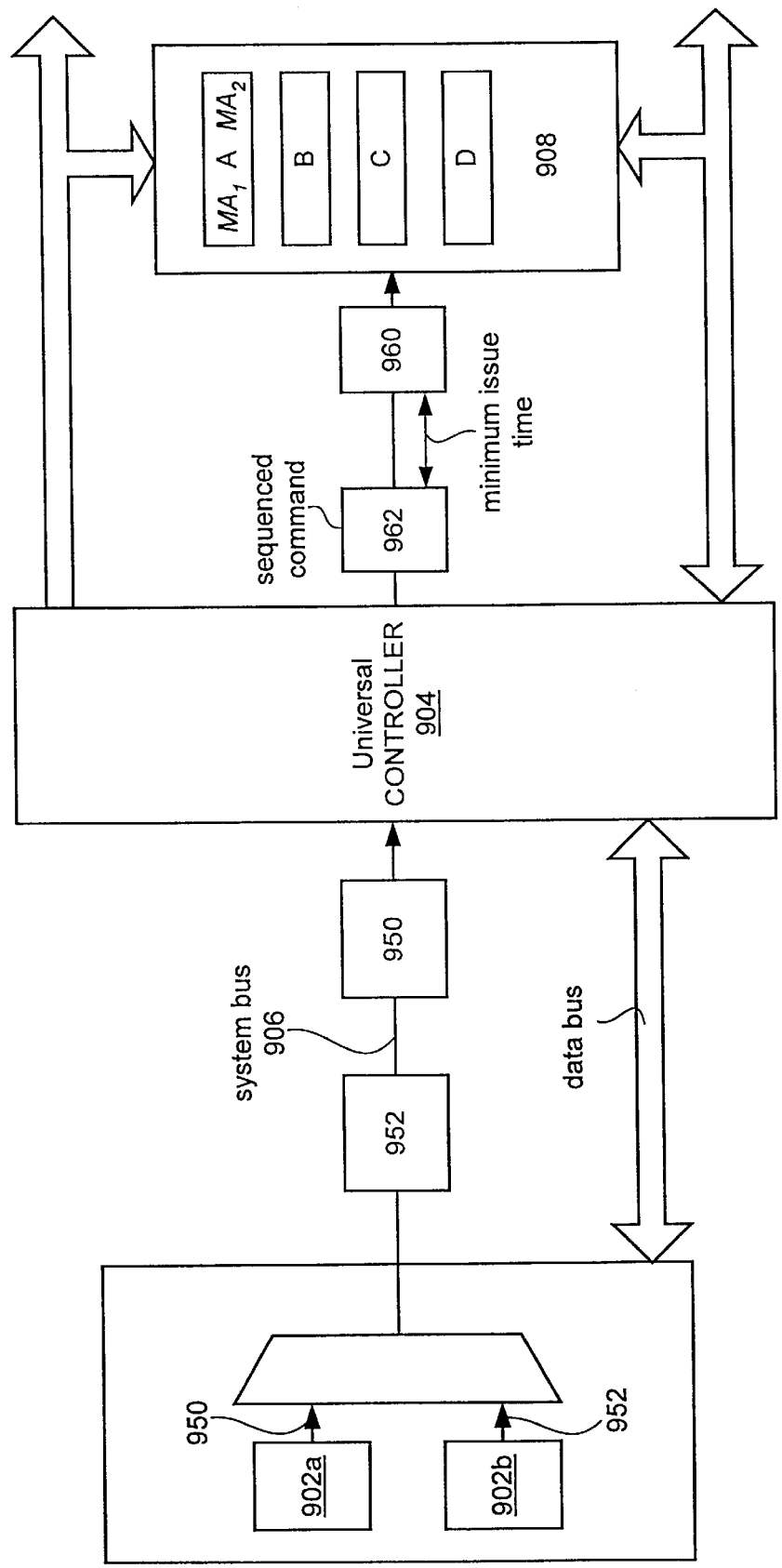
FIG. 9B is a timing diagram showing an exemplary SLDRAM bus transaction in accordance with the multi-processor system shown in FIG. 9A.

By way of example, FIG. 9B shows a representative timing diagram for an exemplary SLDRAM bus transaction in accordance with the multi-processor system 900 shown in FIG. 9. During operation, the processors will typically generate processor command packets such as, for example, a Read command 950 and a Write command 952 for which the appropriate memory bank(s) of the SLDRAM 908 responds accordingly. Typically, the Read command 950 and the Write command 952 are pipelined on the system bus 906 based upon the particular requirements of the processors 902 from which they are generated and not for optimal SLDRAM performance. A system clock $CLK_{sys}$ (not shown) provides the necessary timing signals.

For this example, a processor 902a generates the Read command 950 having a memory address $MA_1$ located in memory chip A of the SLDRAM 908 while a processor 902b generates a Write command 952 having a memory address $MA_2$ also located in memory chip A of the SLDRAM 908. In this example, the Read command 950 is output to the system bus 906 prior to output of the Write command 952. The universal controller 904 receives the Read command 950 first and proceeds to process the command based upon the command itself and the command address $MA_1$ using destination address specific information stored within the universal controller 904. Once the minimum issue time is determined, the universal controller 904 then generates an SLDRAM command packet READ 960 corresponding to the received processor command 950 and issues it to the command bus 912.

Generally, the SLDRAM command packet is organized as four 10 bit words as illustrated in Table 3 representative of a 64M SLDRAM with 8 banks, 1024 row addresses, and 128 column addresses. As shown, there are 3 bits for the bank address (BNK), 10 bits for row address (ROW), and 7 bits for column address (COL). It should be noted that many other organizations and densities are possible and can be accommodated within the 40 bit format described as well as Since the Read command 950 and the Write command 952 are pipelined, the universal controller 904 receives Write command 952 (or it could have been stored in a buffer) some period of time after receipt of the Read command 950 and subsequently issues an SLDRAM command packet WRITE 962 corresponding to the Write command 952. The universal controller 904 uses $MA_2$ specific characterization data as well as the issue time (i.e., the time of issuance) of the READ command 960 to generate a minimum issue time and a data offset for WRITE 962 in order to prevent interference with the previously issued READ command 960 since the same bank (A) is being accessed by both commands.

In this way, the universal controller 904 is capable of dynamically scheduling the issuance of SLDRAM command packets based at least upon particular destination address device operating characteristics as well as the current state of the command and data packet stream.

Figure 10:
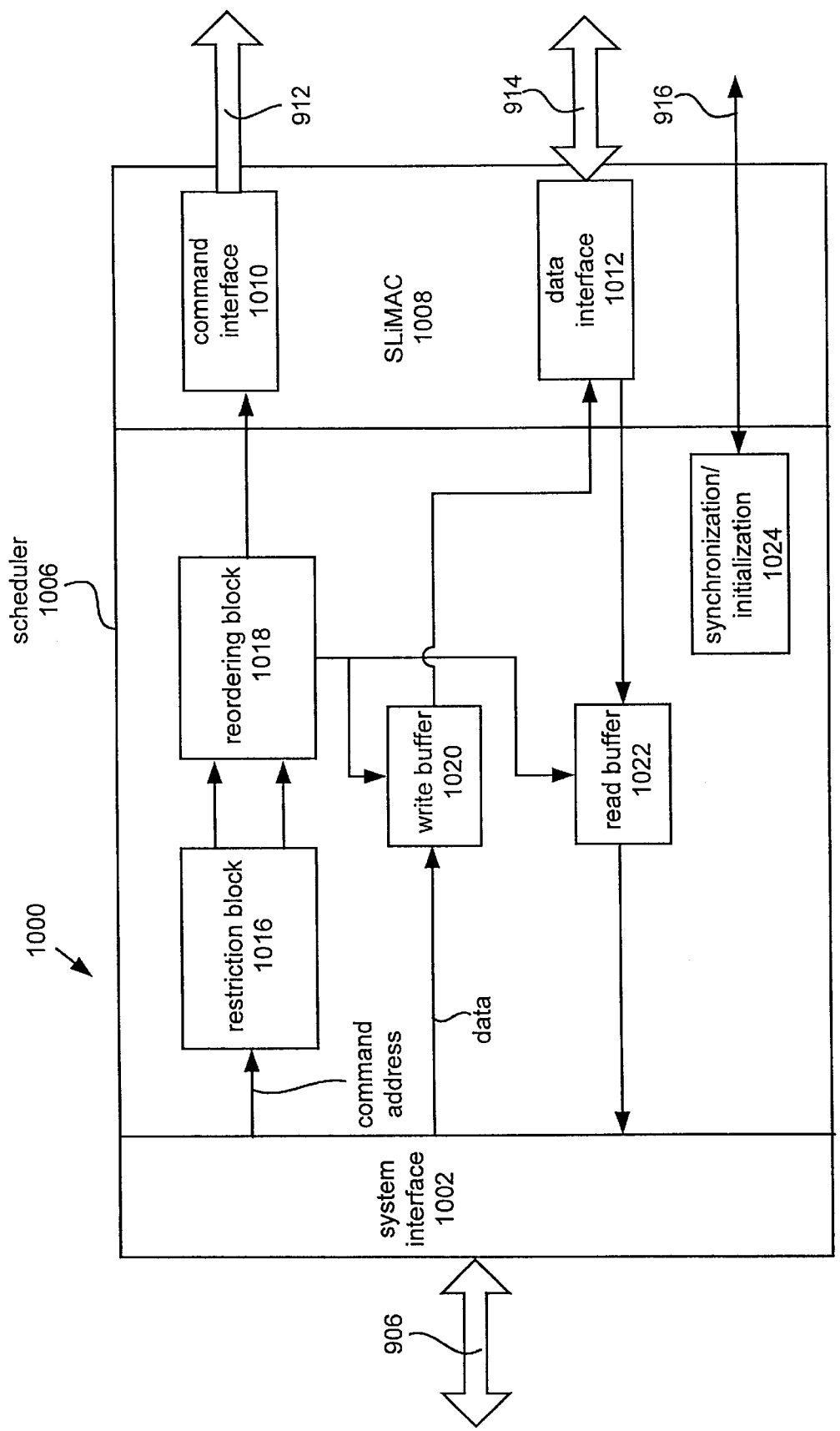
FIG. 10 is a block diagram of a memory controller in accordance with an embodiment of the invention.

Referring now to FIG. 10 illustrating a block diagram of a memory controller 1000 in accordance with an embodiment of the invention. It should be noted that the memory controller 1000 is but one possible embodiment of the universal controller 104 shown in FIG. 1 and should not, therefore, be construed as limiting the scope of the invention. The memory controller 1000 includes a system interface 1002 that connects, by way of the system bus 906, the processors 902 to a memory scheduler 1006 (referred to as the scheduler). In one embodiment of the invention, the system interface 1002 is configured to provide for both the transmission of memory command packets and associated write data packets generated by the processors 902 to the memory command packet scheduler 1004. In the situation where the scheduler 1006 indicates that all internal buffers are full and new commands can not be accommodated, the system interface 1002 holds any new commands until such time as the scheduler 1006 indicates it is ready to accept new commands.

A synchronous link media access controller (SLiMAC) 1008 provides a physical interface between the scheduler 1006 and the SLDRAM 908. More specifically, the SLi- MAC 1008 includes a command interface 1010 and a data interface 1012 connecting the SLiMAC 1008 to the SLDRAM 908 by way of the command bus 912 and the data bus 914, respectively. In a preferred embodiment of the invention, the command interface 1010 transfers memory commands from the SLiMAC 1008 to the SLDRAM 908 accompanied by the associated command clock CCLK. It should be noted that in some embodiments, the SLiMAC 1008 incorporates a clock doubler which uses an interface clock signal ICLK (which is capable of running at approximately 100 MHz) to generate the command clock signal CCLK which typically runs at 200 MHz.

In one embodiment of the invention, the data interface 1012 both receives and transmits data on the data bus 914. It should be noted that the width of the data bus 914 can be as large as necessary to support as many SLDRAMs are required. In order to therefore provide the necessary bandwidth, as many data interfaces as needed can be included in the SLiMAC 1008. By way of example, if the data bus 914 is 32 bits wide (16 bits per SLDRAM, for example) then the SLiMAC 1008 can include 2 data interfaces each capable of handling 16 bits associated with a particular SLDRAM. In this way, the size of the data interfaces included in the SLiMAC 1008 can be closely matched to the particular configurations of the SLDRAMs connected thereto.

In much the same way as with the command interface 1010, the SLiMAC 1008 is capable of providing a data clock signal DCLK that accompanies the read data transferred from the SLDRAM 908 to the SLiMAC 1008. In one embodiment of the invention, the data clock DCLK is generated by using the clock doubler to double the interface clock ICLK frequency from approximately 100 MHz to approximately 1000 MHz. It should also be noted that the interface clock signal ICLK, the command clock signal CCLK, and the data clock signal DCLK are all phase synchronous.

In a preferred embodiment of the invention, the scheduler 1006 includes a restriction block 1016 arranged to receive system command and associated system address data from the system interface 1002 connected thereto. The restriction block 1016 provides SLDRAM command packet data and associated timing information to a reordering block 1018. A write buffer 1020 receives write data from the system interface 1002. As directed by the scheduler 1006, read data is transferred from the data interface 1012 through a read buffer 1022 connected to the data bus 914 is arranged to provide read data to the system interface 1002. An initialization/synchronization (I/S) block 1024 connected to the I/S bus 916 provides appropriate initialization and/or synchronization signals to the SLDRAM 908 as required.

In operation, the scheduler 1006 receives pipelined memory command packets generated by the processors 902. Typically, the memory command packets are composed of a memory command and associated memory address. In one embodiment of the invention, the scheduler 1006 decodes the memory address associated with the received new command in order to determine the destination address to which the memory command and associated data packet (if any) are directed. Once decoded, the scheduler 1006 uses destination address specific device characterization data stored therein as well as information associated with a just prior issued memory command to issue a new SLDRAM command packet. The new SLDRAM command packet is output to the command bus 912 and ultimately to the SLDRAM identified by the CHIP ID included in the SLDRAM command packet.

As part of the scheduling process, the scheduler 1006 determines the minimum amount of time after the issuance of the just prior issued command required before the issuance of the new command. Since, as described above, each hierarchical level, such as for example, a memory bank, of a SLDRAM can have different operating characteristics (usually provided by the manufacturer), the scheduler 1006 polls each SLDRAM it services during initialization. In some embodiments, the memory specific parameters (such as timing) can be written directly into the restriction block register 1016 if the connected memory devices do not allow do not allow polling in order to determine operating characteristics. Once the SLDRAMs are polled, the scheduler 1006 stores the device specific information which it later uses to develop the appropriate scheduling protocols. In this way, the scheduler 1006 is capable of adaptively providing scheduling services to any number and type of SLDRAMs without resorting to hardwiring or other time consuming and expensive procedures.

Figure 11:
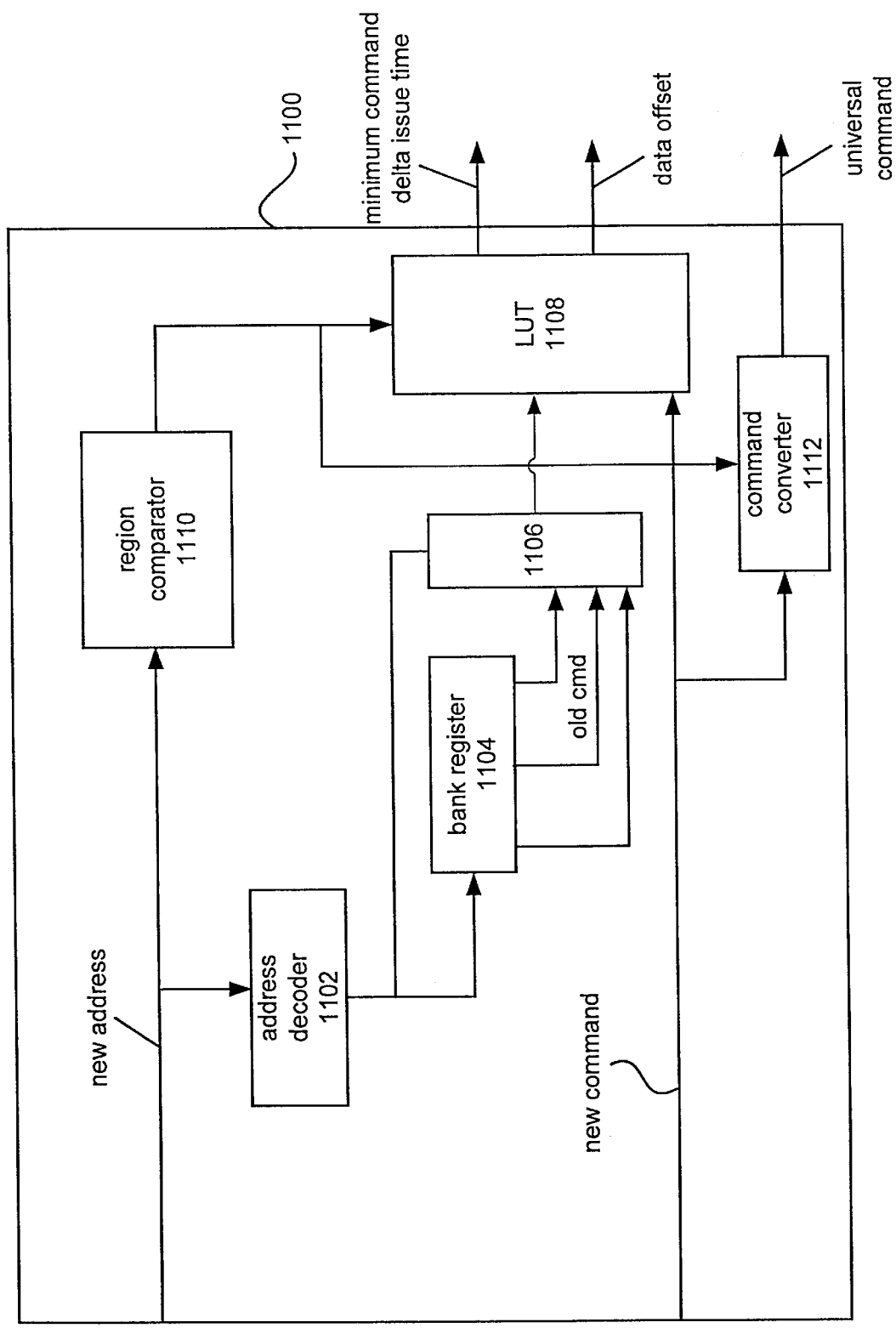
FIG. 11 is a block diagram of a restriction block in accordance with an embodiment of the invention.

FIG. 11 is a schematic illustration of a restriction block 1100 in accordance with and embodiment of the invention. It should be noted that the restriction block 1100 is but one possible embodiment of the restriction block 1016 shown in FIG. 10 and as such should not be construed as limiting. The restriction block 1100 includes an address decoder 1102 connected to the system interface 1002 arranged to decode a received new address signal associated with a new memory command generated by the processors 902. The decoded new address signal provides an input to a array tag register 1104 in which is stored the status and other relevant information for all, or in some cases only a subset, of pertinent SLDRAM memory banks. The array tag register 1104 provides an input to a selector 1106 which passes relevant data for the selected virtual bank based upon the decoded new command address to a look up table (LUT) 1108.

The restriction block 1100 also includes a region comparator 1110 also connected to the system interface 1002 arranged to use the received new address signal to provide a region identifier indicative of the region of memory for which the new command address is located. In this way, the restriction block 1100 is capable of providing a best case scheduling protocol for the new memory command based at least in part on the memory region specific characterization data. The region comparator 1110 provides the region identifier to the LUT 1108 as an input along with the new command signal. The LUT 1108, in turn, provides a minimum delta issue time and a data offset which is used to convert the new command and associated new address into an SLDRAM command packet. It should be noted that the minimum delta issue time indicates the delta time (in clock cycles) to issue the new command in relation to the just issued old command. The data offset time is indicative of the delta time in clock cycles in order to receive a read data packet associated with the new command after the issuance of the new command.

In one embodiment of the invention, the restriction block 1100 includes 16 array tag bank registers and the LUT 1108 is capable of storing four different parameter sets for four timing regions each, in turn, having 16 associated registers.

Figure 12:
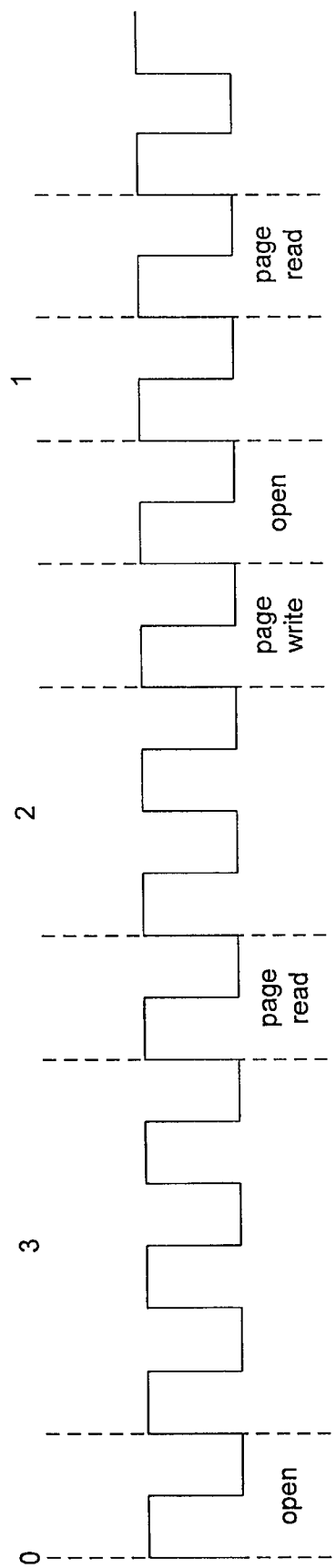
FIG. 12 is an exemplary SLDRAM command timing diagram in accordance with an embodiment of the invention.

FIG. 12 is a timing diagram 1200 of a SLDRAM bus signals in response to received processor commands in accordance with an embodiment of the invention. It should be noted that TABLE 4 summarizes the scheduling process carried out by the restriction block 1100 by identifying the various generated signals. It should also be noted that a memory command takes the form of {command, address} where "command" represents the instruction to be executed and "address" the associated memory location.

Referring now to TABLE 4 and FIG. 12, during a system clock cycle $\emptyset_1$, a first {OPENPAGE, 1000} command is received at the address decoder 302 and concurrently at the region comparator 1110. For this example, the address decoder 1102 decodes the OPENPAGE command address "1000" as "100" and "400" which the region comparator 1110 determines to be included within memory region 0. Since the OPENPAGE command is the first command to be received, there are no "hits" with any of the Virtual Banks $B_0$-13 and a corresponding replacement counter is set to "0". In the described embodiment, the replacement counter is updated based upon a pseudo-random counting scheme whereas in other embodiments random counting or other appropriate schemes can be used. Since the first {OPENPAGE, 1000} command is an open type command, there is no associated minimum delta issue time or data offset, and thus the page at address 1000 is opened on the first command clock cycle $\emptyset C_1$.

During a next system clock cycle $\emptyset_2$, a {READ, 1000} command is received at the restriction block 1100 which the address decoder 1102 decodes as 100 and 400 (i.e.; reading the page opened at memory address location 1000 from the previous clock cycle) which again causes the region comparator 1110 to set the region identifier to REGION1. In this case, however, the previous, or otherwise referred to as the "old command" having been stored in a $B_0$ register results in a "hit" at $B_0$ which causes the selector to output "READ" as the "old command" input to the LUT 1108. Additional inputs include the region indicator REGION1 generated by the region comparator 1104 and the "new command" input as READ. The LUT 1108 utilizes stored characterization data to generate a minimum delta issue time of 3 command clock cycles $\emptyset_3$ which indicates that at least 3 command clock cycles must separate the issuance of the {PAGEOPEN, 1000} command and the associated {READ, 1000} command.

In this way, each memory command packet received at the restriction block 1100 is processed according to the characterization data stored within the LUT 1108 and at least in part on the just prior issued command.

Figure 13A:
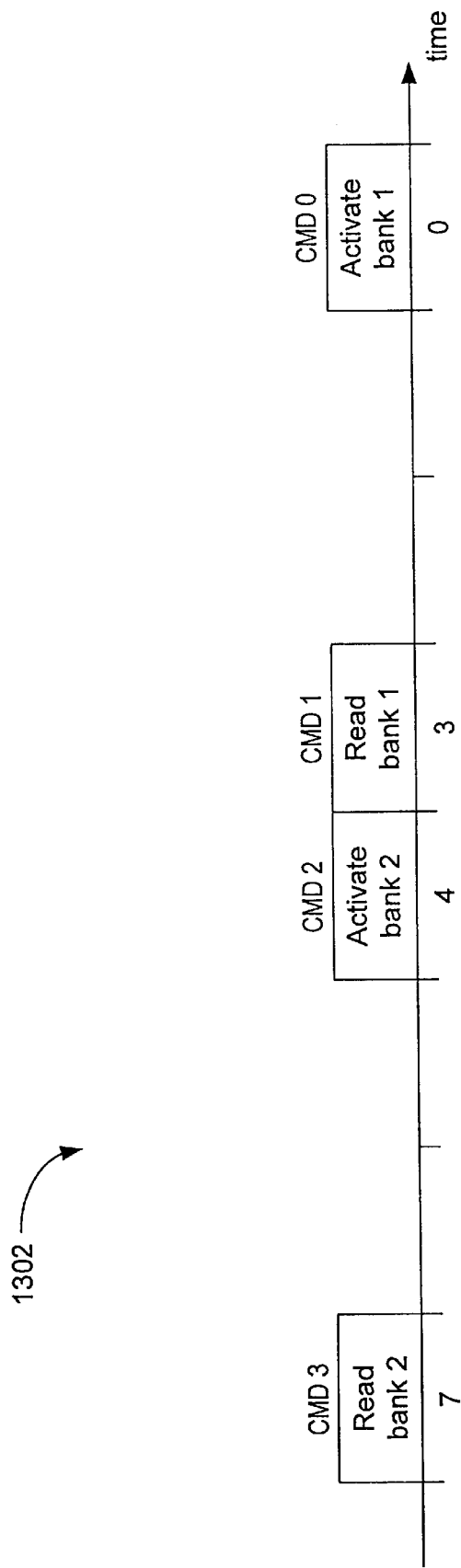
FIGS. 13A–13C are timelines illustrating the reordering of memory commands according to a specific embodiment of the present invention.
Figure 13B:
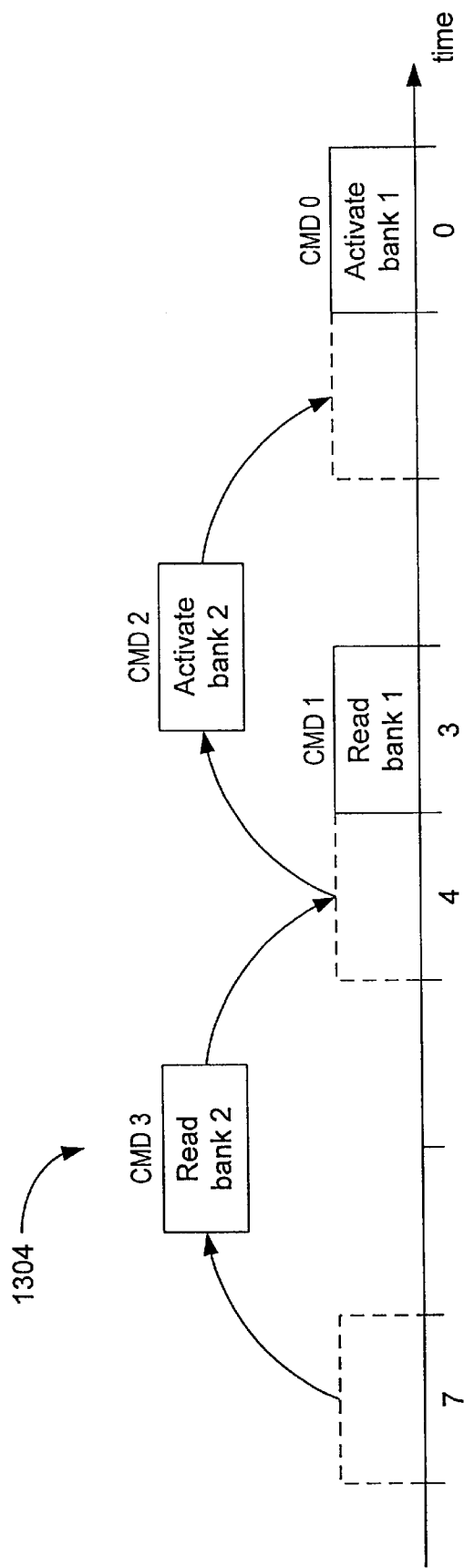
Figure 13C:
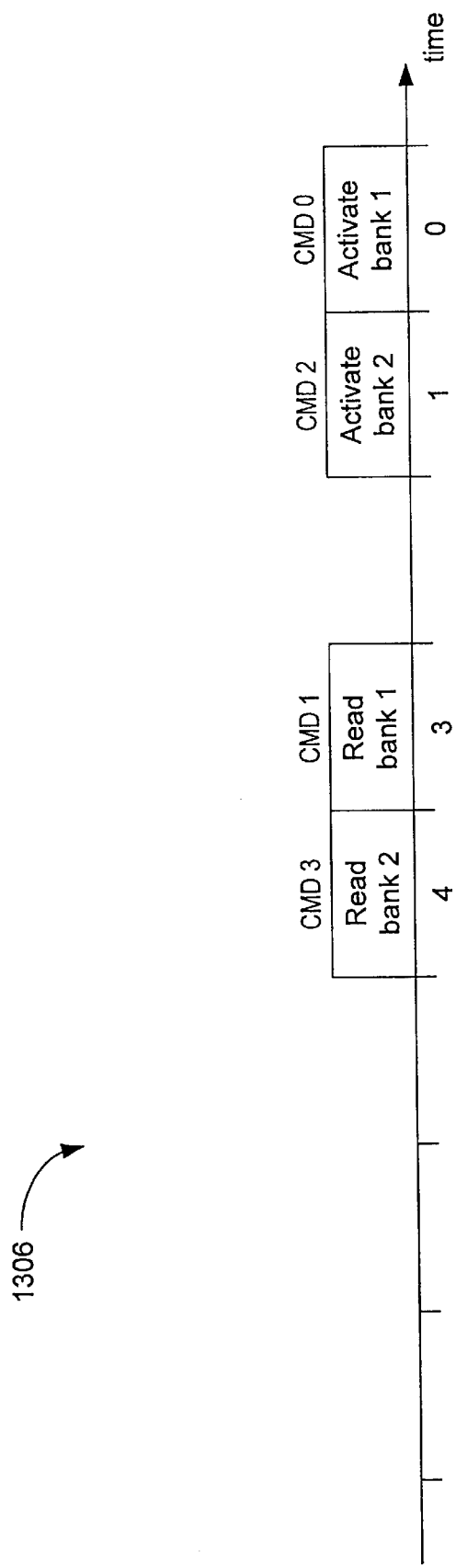

The reordering of commands received from the restriction block according to a specific embodiment of the invention will now be described. FIGS. 13A–13C are timelines 1302 and 1304 which, through a simple command reordering example, serve to illustrate some of the advantages which may be realized by reordering memory commands according to a specific embodiment of the present invention. Each timeline shows four read commands corresponding to two different memory banks. CMD0 and CMD1 are read commands directed to bank 1 of the associated memory. CMD2 and CMD3 are read commands directed to bank 2 of the associated memory. Timeline 1302 shows memory commands arranged on a command bus connecting a memory controller and a memory in the order in which the commands were received by the memory controller from the system processor; CMD0 occupies time slot 0, CMD1 occupies time slot 3, CMD2 occupies time slot 4, and CMD3 occupies time slot 7. Each time slot represents one clock cycle.

As discussed above, commands to the same memory bank must have some minimum delay between issuance to accommodate servicing of the previously issued command. This is represented in FIG. 13A by the two time slots between each pair of commands. As can be seen, if the four read commands are sent to the memory in the order shown in FIG. 13A, the command bus will go unused during four available clock cycles, i.e., times slots 1, 2, 5 and 6. As will be discussed at least some of this inefficiency may be ameliorated by reordering the command according to the present invention.

Timelines 1304 and 1306 of FIGS. 13B and 13C, respectively, illustrate the reordering of the commands of FIG. 13A according to a specific embodiment of the invention and at least some of the advantages gained thereby. In this example, conflicts on the data bus are not considered for the sake of simplicity. As discussed below, however, attention must be given to such considerations for effective reordering of memory commands. Due to the fact that CMD2 and CMD3 are directed to a different memory bank than CMD0 and CMD1, memory access latencies as between the two pairs of commands are irrelevant and may be ignored. That is, the commands may be rearranged as shown in timeline 1304 to place CMD2 in time slot 1 immediately following CMD0, and CMD3 in time slot 4 immediately following CMD1. This is because there does not need to be any delay between the issuance of CMD0 and CMD2 or between the issuance of CMD1 and CMD3 due to the fact that they are directed to different banks of memory. However, as will be understood and as shown in FIG. 13C, the minimum delay time, e.g., two clock cycles, between the pairs of commands directed to the same bank must be maintained. That is, reordering of commands may not involve attempts to reduce the delay time between successive commands to the same memory bank.

The result of reordering the commands is shown in FIG. 13C in which the four commands are issued in five clock cycles with only time slot 2 going unused. It will be understood, of course, that a fifth memory command to yet another memory bank may be inserted in time slot 2 to further maximize the efficiency with which the command bus is used.

Figure 14:
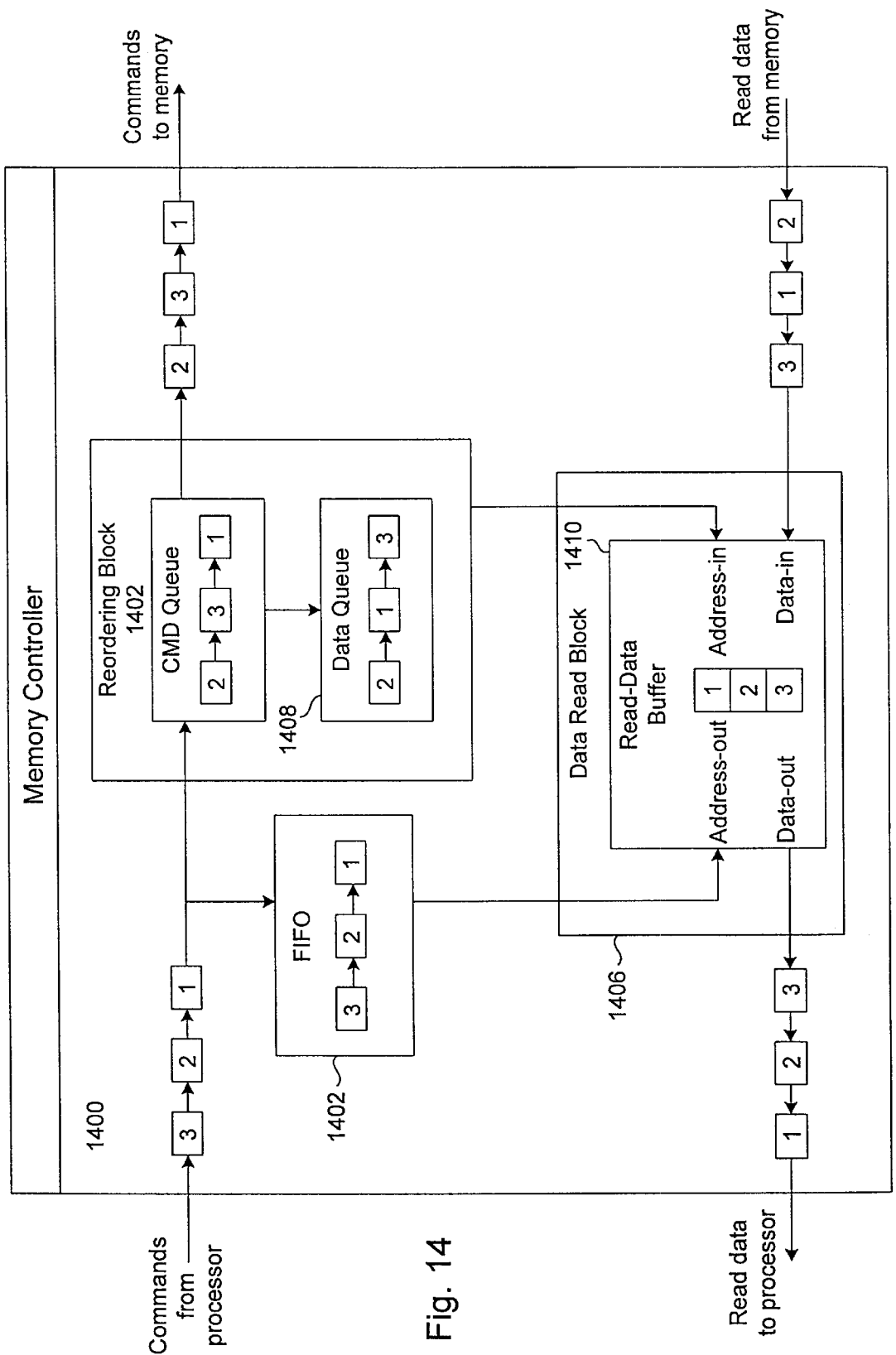
FIG. 14 is a block diagram of a portion of a memory controller designed according to a specific embodiment of the invention.

FIG. 14 is a block diagram of a portion of a memory controller designed according to a specific embodiment of the invention. Reordering circuitry 1400 receives a sequence of incoming memory commands, i.e., 1, 2, 3, from the system processor. According to a specific embodiment, the memory commands are transmitted to reordering circuitry 1400 via restriction circuitry (not shown) which, as described above, imposes issue time constraints on selected commands relative to other commands directed to the same logical bank of the associated memory. The commands are reordered in command queue 1402 from which the commands are issued to the memory. In this example, the commands are reordered into the sequence 1, 3, 2.

The original memory command sequence, i.e., 1, 2, 3, is stored in a FIFO memory 1404 in data-read circuitry 1406. The sequence in FIFO 1404 is used for reordering the data received from the memory to correspond to the order in which the commands were originally received by the memory controller. It should be noted, however, that some of the processors expect in-order data while others expect out-of-order data, therefor, by switching the FIFO 1404 on and off as required, any type data order can be supported. This is necessary because the processor "expects" to receive the data in an order corresponding to the order in which it originally transmitted the commands to the memory controller.

In addition, because data from the memory may be received by the memory controller in a sequence which does not correspond to the original sequence in which the processor transmits the memory commands, a third sequence is stored in data queue 1408. This sequence (in this example 3, 1, 2) represents the order in which the data corresponding to the command sequence 1, 3, 2, will be received by data-read circuitry 1406. The data queue sequence is computed by reordering circuitry 1400 based on the command queue sequence and known latencies associated with the various logical banks of the memory. When the memory transmits data to the memory controller in the sequence stored in data queue 1408 (i.e., 3, 1, 2), the data are stored in read-data buffer 1410 and reordered based on the information in FIFO 1404 and data queue 1408 such that the data are transmitted to the processor in an order corresponding to the original command sequence order, i.e., 1, 2, 3.

Figure 15:
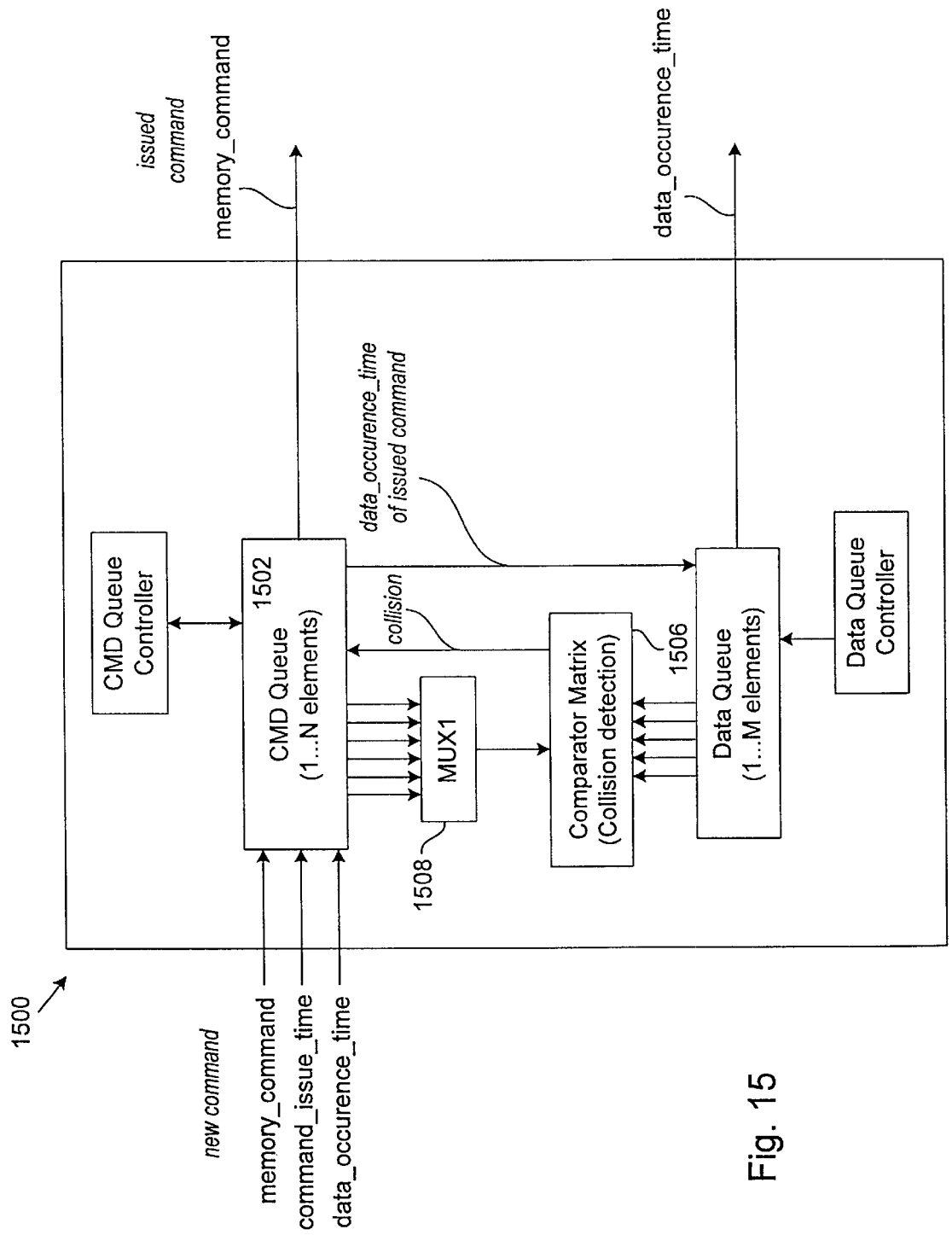
FIG. 15 is a block diagram of reordering circuitry designed according to a specific embodiment of the invention.

FIG. 15 is a block diagram of reordering circuitry 1500 in a memory controller designed according to a specific embodiment of the invention. Reordering circuitry 1500 includes command queue 1502 which stores and reorders commands received from the system processor. Command queue 1502 calculates an issue time for each command, issues the commands, and removes the issued commands from the queue using command issue time constraints associated with commands to the same logical bank in memory as well as data bus usage constraints.

Data queue 1504 stores data elements representing data occurrence times corresponding to issued memory commands, calculates new data occurrence times for each new entry in the queue, and removes queue entries when the corresponding memory transaction is completed.

Comparator matrix 1506 performs a collision detection function in which the data occurrence time of a command ready to be issued from command queue 1502 (as communicated via multiplexer 1508) is compared to the data occurrence times of previously issued commands as represented in data queue 1504. If a collision is detected, issuance of the command is delayed.

Figure 16:
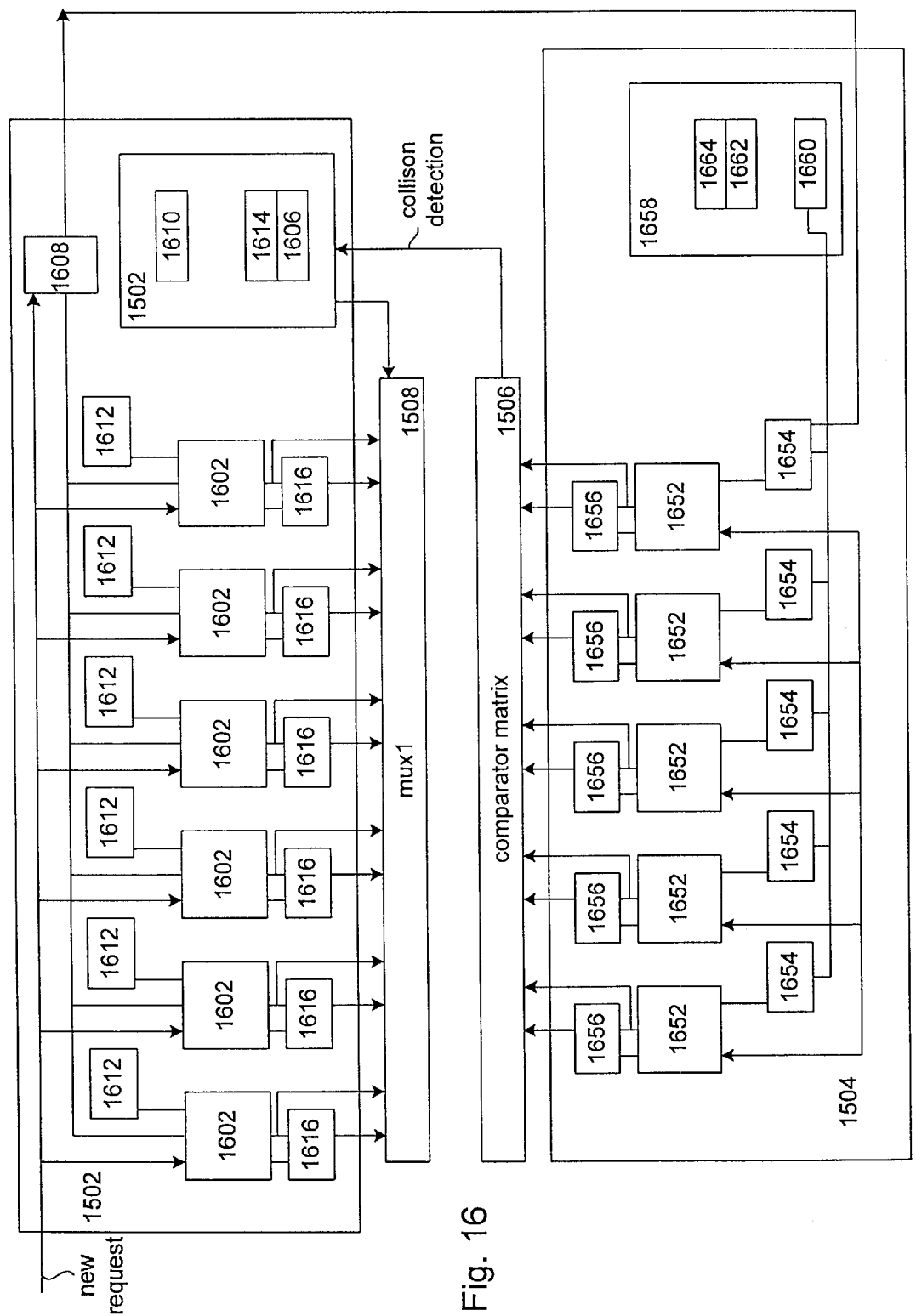
FIG. 16 is a more detailed block diagram of the reordering circuitry of FIG. 15.
Figure 17:
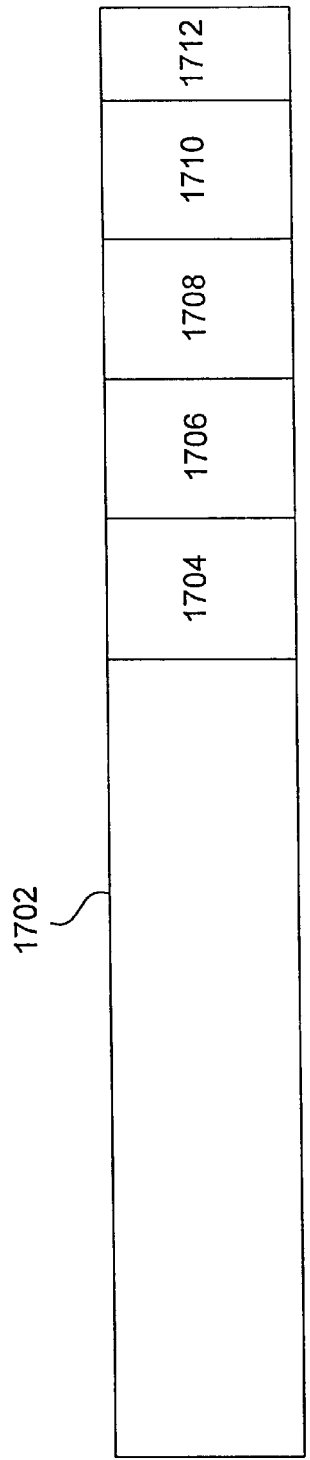
FIG. 17 is a diagram of the contents of a command queue element according to a specific embodiment of the invention.

FIG. 16 is a more detailed block diagram of reordering circuitry 1500 of FIG. 15. Command queue 1502 comprises six command queue elements 1602 each of which stores 61 bits of information regarding a particular memory command as illustrated by the diagram of FIG. 17. Command field 1702 contains the 40-bit memory command packet which specifies the memory command. Command issue time ($C_d$) field 1704 is a 6-bit field which indicates a delta time in clock cycles before the command may be issued. The value in field 1704 is determined by the restriction circuitry as described above and relates to the most recent memory command corresponding to the same logical bank in the memory. That is, the value in the $C_d$ field indicates the latency between two commands to the same bank. The information about the required latencies for each bank are stored in the restriction circuitry and are determined largely by the physical characteristics of the memory. Once in the command queue, the $C_d$ field is decremented once for each clock cycle with some exceptions. For example, the latency between successive commands to the same logical bank cannot be changed. Thus, if the $C_d$ field for a command directed to a particular bank reaches zero and is not issued, the $C_d$ fields for all other commands to the same bank cannot be decremented until the first command is issued.

Data occurrence time ($D_d$) field 1706 is a 6-bit field which indicates a delta time in clock cycles between issuance of a memory command from the command queue to transfer of the corresponding data. $D_d$ field 1706 may not be altered in the command queue. Command ID field 1708 is a 5-bit field which uniquely identifies the command in command packet 1702. This information is used with corresponding information in the FIFO and the data queue to keep track of which packets are which and which data correspond to which packets so that reordering of commands and data may be effected. Logical bank (B) field 1710 is a 3-bit field which identifies to which logical bank in the memory the command packet is directed. Finally, burst indicator ($D_b$) field 1712 is a 1-bit field which indicates whether the data being requested or written occupy one or two clock cycles.

Referring back to FIG. 16, the operation of the command queue is controlled by command queue controller 1604. Controller 1604 keeps track of which command queue elements 1602 are available and controls insertion of incoming commands into a particular queue element 1602 via free position indicator 1606. Controller 1604 also facilitates insertion of command queue element information into data queue 1504 once the corresponding command has been issued. According to a specific embodiment, commands are inserted into command queue 1502 without regard to the availability of free time slots on the command or data buses.

A command may be issued to the command bus from any one of command queue elements 1602 via multiplexer 1608 if its $C_d$ count is zero and there are no collisions on the data bus indicated. That is, free time slots on the command bus and/or the data bus must be identified. If a command is not a read or a write (and therefore requires no data bus resources) only a command bus time slot is needed. If the command is a read or a write, time slots on both the command and data buses are needed.

Zero comparator 1610 in controller 1604 is used to make the first determination, i.e., whether $C_d$=0. Subtractors 1612 are used to subtract "1" from the $C_d$ count for each command queue element 1602 each clock cycle unless there is an exception as described above, i.e., where $C_d$=0 for a particular command which cannot be issued. In such a case queue controller 1604, using the $C_d$ and B fields for all queue elements, generates a mask signal (M) which prevents the $C_d$ count for all commands to the same logical bank from being decremented.

According to a specific embodiment, if there are two queue elements having $C_d$=0, the one with the highest priority (e.g., the oldest one) is issued. Address shifter 1614 determines the priority of commands in the queue as will be discussed in greater detail below with reference to FIG. 18. According to another specific embodiment, if a new command arrives at the command queue with its $C_d$ count already at zero, it may be transferred directly to the memory via multiplexer 1608. A new command is stored in a command queue element 1602 if its $C_d$ count is nonzero or there are other commands stored in the command queue with $C_d$=0 and higher priority. If, however, the command queue is empty, then a new command can be immediately issued (if $C_d$ is equal to zero).

For read or write commands, collisions are detected using the $D_d$ and $D_b$ fields of the command queue element 1602 containing the command ready to be issued. The occurrence time and duration of the data corresponding to the command are transmitted to comparator matrix 1506 via multiplexer 1508 which is, in turn, controlled by queue controller 1604. That is, queue controller 1604 controls multiplexer 1508 to transmit the data occurrence time and duration (either one or two clock cycles) of the queue element for which the command issue time, i.e., $C_d$, is zero. The duration is indicated to be either one or two clock cycles by adding the $D_b$ bit to the data occurrence time $D_d$ with adders 1616 which yields either a "0" for $D_{d+1}$ (indicating one clock cycle) or a "1" (indicating two clock cycles). The data occurrence time and duration are then compared in comparator matrix 1506 with the data occurrence times and durations of five previously issued commands stored in data queue 1504. According to a specific embodiment, comparator matrix 1506 comprises a 2*10 parallel comparator matrix.

Figure 18:
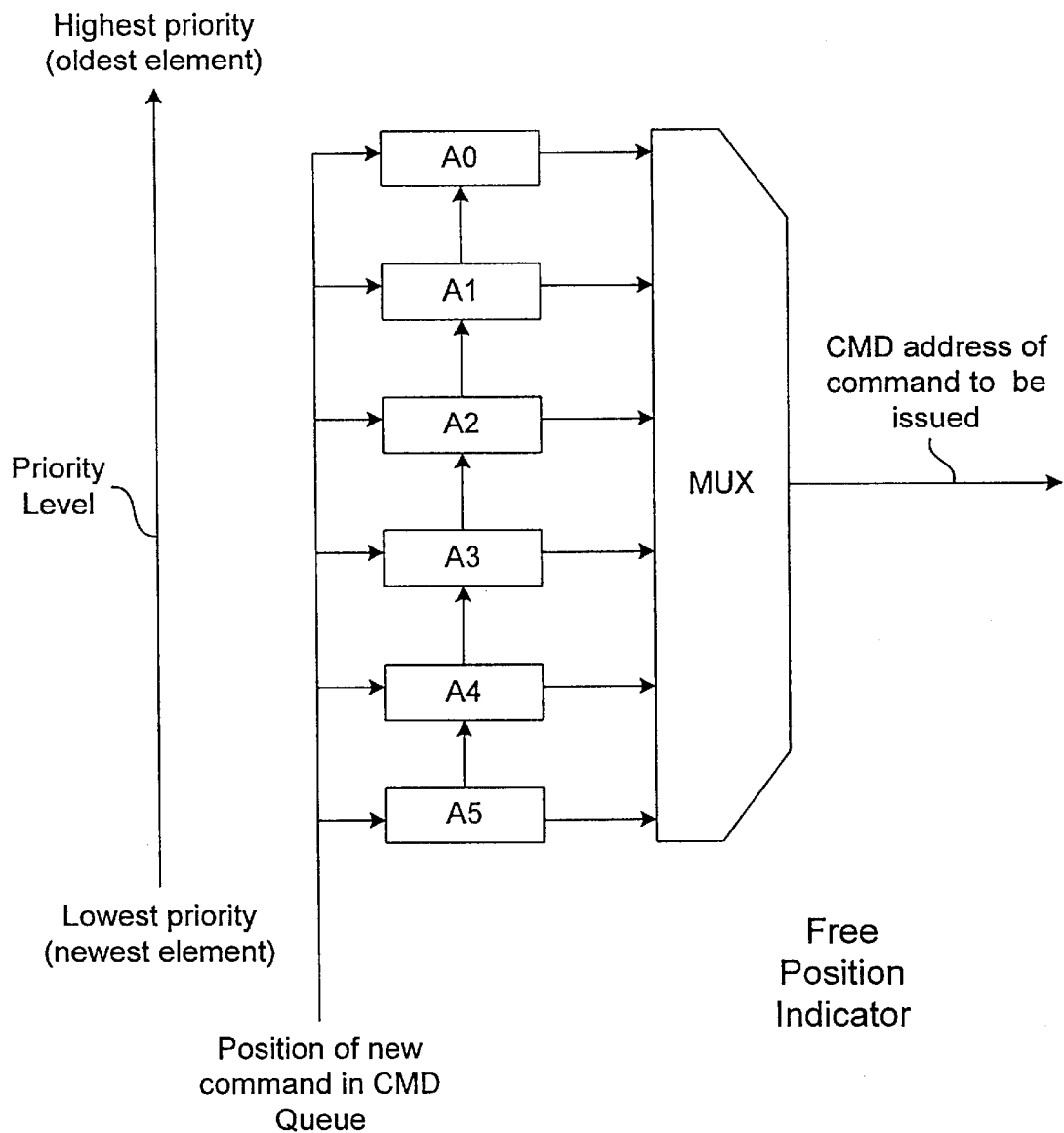
FIG. 18 is a block diagram of a specific embodiment of an address shifter.

FIG. 18 is a block diagram of a specific embodiment of address shifter 1614 of FIG. 16. As mentioned above, address shifter 1614 determines the priority of commands. Also as discussed above, new commands are inserted into any free command queue element 1602 according to free position indicator 1606. The address of the command queue element 1602 into which a new command is inserted is inserted into the first free position (A0–A5) with the highest priority. The result is that the A0 position in address shifter 1614 stores the queue element address for the oldest command which has not already issued. When a command is issued from the command queue, the corresponding entry in address shifter 1614 is removed and the addresses for lower priority commands are shifted into higher priority positions. As discussed above, when the Cd count for a command in the command queue reaches zero it may be issued.

If, however, there are more than one command for which Cd=0, the oldest one, i.e., the command with the highest priority as indicated by the position of its address in address shifter 1614, is issued.

Figure 19:
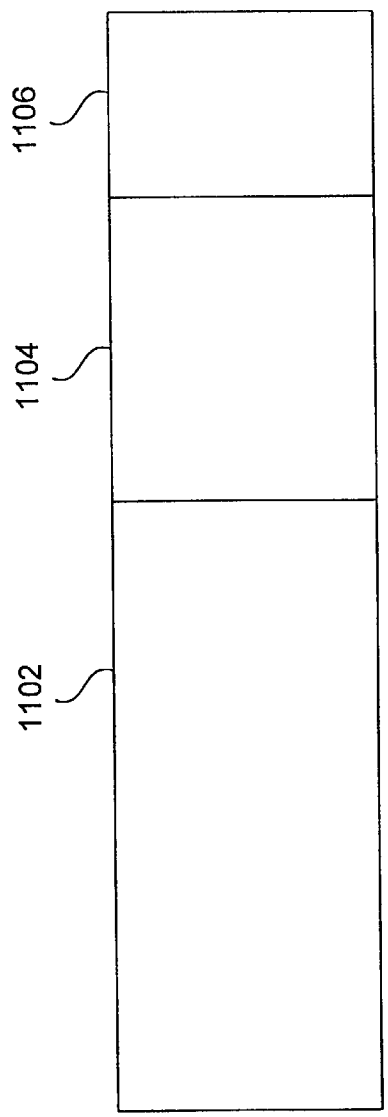
FIG. 19 is a diagram of the contents of a data queue element according to a specific embodiment of the invention.

Data queue 1504 of FIG. 16 comprises five queue elements 1652 each of which stores 12 bits of information regarding a previously issued memory command as illustrated by the diagram of FIG. 19. Data occurrence time ($D_d$) field 1902 is a 6-bit field which indicates a delta time in clock cycles between issuance of a command from the command queue and reception of the corresponding data. The $D_d$ count for each data queue element 1652 is decremented every clock cycle using one of subtractors 1654 until its value reaches zero. When $D_d=0$, the corresponding data are on the data bus. Therefore, it will be understood that only one data queue element 1652 may have $D_d=0$ at any given time. After the $D_d$ count reaches zero the information in the corresponding data queue element is removed from data queue 1504. Command ID field 1904 is a 5-bit field which uniquely identifies the issued command to which the data correspond. This information is useful for reordering the data to correspond to the order in which the commands were originally transmitted to the memory controller. Finally, burst indicator ($D_b$) field 1906 is a 1-bit field which indicates whether the data occupy one or two clock cycles.

Referring back to FIG. 16 and as described above, the data occurrence time ($D_d$) and duration for each of data queue elements 1652 are compared in comparator matrix 1506 to the $D_d$ and duration for a command in command queue 1502 which is ready to be issued, i.e., for which $C_d=0$. The duration is indicated to be either one or two clock cycles by adding the $D_b$ bit to the data occurrence time $D_d$ with adders 1656 which yields either a "0" for $D_{d+1}$ (indicating one clock cycle) or a "1" (indicating two clock cycles). If the comparison shows no collisions on the data bus, the command is issued from the command queue.

Data queue controller 1658 controls operation of data queue 1504. Free position indicator 1660 along with command queue controller 1604 facilitates insertion of new data queue element information into data queue elements 1652. Free position indicator also facilitates removal of information from data queue elements 1652 when the corresponding memory accesses are complete. Zero comparator 1662 and burst indicator 1664 are used to determine when $D_d$ for any of data queue elements 1652 is zero and when the data transfer no longer occupies the data bus, and thus when the corresponding information may be removed from the data queue.

According to another specific embodiment of the invention, collision detection becomes more complex through the use of a two-dimensional array of comparators and multiplexers. This approach is more silicon intensive than the one-dimensional approach described above and looks at all of the elements in the command queue rather than only the one for the command ready to be issued. It schedules commands not only with respect to previously issued commands, but also with respect to the order of data packets on the data bus.

In order to insert a new command, each set of two consecutive stages in the to-be-issued portion of the command pipe must be compared to see if a new command can be inserted between them. The comparison actually determines a range that the command can be inserted into. This range is as follows:

$CLEN_x$=command length $$T_{cstart}+t_{cA}=CLEN_A \qquad (1)$$

$$T_{cend}=t_{cB} \qquad (2)$$

Where $t_{cA}$ are $t_{cB}$ are the issue times for consecutive pipeline elements A and B. Pipeline element A is ahead of pipeline element B and thus its issue time is the lower of the two. If there is to be an insertion there must of course be at least one open slot between the A and B elements. Thus:

$$N=T_{cend}-T_{cstart}+1 \qquad (3)$$

(where N=number of issue slots between elements A and B)

$$LEN<=t_{cb}-t_{ca}-CLEN_A \qquad (4)$$

In hardware it is easy to simply implement the condition:

$$(t_{cB}-CLEN_A)-(t_{cA}+CLEN_A)=>0 \qquad (5)$$

The start and end points of the range also specify a possible range of associated data slots. This range must be compared to each set of successive elements in the data pipe to see if there is an overlap and what the new range will be. Five distinct cases exist for this comparison.

Case 0

In this case the range described by the data slots $t_{dA}$ and $t_{dB}$ is completely outside of the range of the two consecutive elements M and N. In this case then:

$$t_{dA}+CLEN_A=>t_{dN} \qquad (6)$$

or, where DLENx=DATA LENGTH, $$t_{dB}<=t_{dM}+DLEN_M \qquad (7)$$

There is no possible data slot between the pair M and N.

Case 1

In this case the range described by the data slots $t_{dA}$ and $t_{dB}$ is completely within the range of the two consecutive elements M and N. In this case then:

$$t_{dA+CLENA} => t_{dm} + DLEN_M \quad (8)$$

and $$t_{dB} - CLEN + DLEN <= t_{dN} \text{ (where CLEN is a new command length and DLEN is new data length in slots)} \quad (9)$$

The earliest possible data slot time in this case is $t_{dA} + LEN_A$ with a corresponding command issue time of $t_{cA} + CLEN_A$ Case 2

In this case the range described by the data slots tdA and tdB spans the element M. In this case then:

$$t_{dA} + CLEN_A < t_{dM} + DLEN_M \quad (10)$$

and $$t_{dB} - CLEN + DLEN > t_{dM} + DLEN_M \text{ and } t_{dB} - CLEN + DLEN < t_{dM} \quad (11)$$

The earliest possible data slot time in this case is $t_{dM} + DLEN_M + 1$ with a corresponding command issue time of $t_{dM+CLENM} - DATA\_OFFSET$ where DATA OFFSET is the time between command issue time and data occupancy.

Case 3

In this case the range described by the data slots tdA and tdB spans the element N. In this case then:

$$t_{dA} + CLEN_A > t_{dM} + DLEN_M \quad (12)$$

and $$t_{dA} + CLEN_A + DLEN < t_{dN} \quad (13)$$

Thus the earliest possible data slot time in this case is $t_{dA} + CLEN_M$ with a corresponding command issue time of $t_{cA} + CLEN_A + 1$. It should be noted that the case 1 can also lie within this case.

Case 4

In this case the range described by the data slots $t_{dA}$ and $t_{dB}$ encapsulates the range defined by the elements M and N. In this case then:

$$t_{dA} + CLEN_A < t_{dM} + DLEN_M \quad (14)$$

and $$t_{dB} - LEN > Ct_{dN} \quad (15)$$

Thus the earliest possible data slot time in this case is $t_{dM} + CLEN_M$ with a corresponding command issue time of $t_{cM} + CLEN_A + DATA\_OFFSET$ where DATA_OFFSET= $t_{dA} - t_{cA}$.

It is clear that Case 1 and Case 3 are identical for the purpose of scheduling as the earliest possible slot is always taken. The combined case therefore is Case 3. Similarly Case 2 and case 4 are identical as the desired result is $t_{dM} + LEN_M$. In this case it must simply be shown that $t_{dM}$ is spanned by the range given by $t_{dA}$ and $t_{dB}$. Additionally the earliest possible issue time ($t_c$) and data slot ($t_d$) for the incoming command must be considered. The comparisons that must be made at each data pipe pair for each command pipe pair are:

```
if(((t_cB - CLEN) => (t_cA + CLEN_A)) && (t_c <= (t_cA + CLEN_A))){
    if(((t_dA + CLEN_A) <= (t_dM + DLEN_M)) && ((t_dB - DLEN - (t_dM + DLEN_M)) >= 0)){
        t_d = t_dM + DLEN_M;
        t_c = t_cA - t_dA + t_dM + DLEN_M;
    }
    else if(((t_dN - (t_dA + CLEN_A + DLEN_A)) >= 0) && (t_dA + CLEN_A) >= (t_dM + DLEN_M)){
        t_d = t_dA + CLEN_A;
        t_c = t_cA + CLEN_A;
    }
    else {
        t_d = IMPOSSIBLE;
        t_c = IMPOSSIBLE;
    }
}
else if(((t_cB - CLEN) => t_c) && (t_c > (t_cA + CLEN_A))){
    if((t_d < (t_dM + DLEN_M)) && ((t_dB - DLEN - (t_dM + DLEN_M)) >= 0)){
        t_d = t_dM + DLEN_M;
        t_c = t_c - t_d + t_dM + DLEN_M;
    }
    else if(((t_dN - (t_d + DLEN)) >= 0) && t_d >= (t_dM + DLEN_M)){
        t_d = t_d;
        t_c = t_c;
    }
    else {
        t_d = IMPOSSIBLE;
        t_c = IMPOSSIBLE;
    }
}
else {
    t_d = IMPOSSIBLE;
    t_c = IMPOSSIBLE;
}
```

Thus for the command pipe the needed operations are:

$t_{cB} - CLEN => t_{cA} + CLEN_A$ $t_{cB} - CLEN => t_c$ $t_c + CLEN <= t_{cB}$ $t_c > t_{cA} + CLEN_A$ $t_c <= t_{cA} + CLEN_A$

While for the data pipe the needed operations are:

$t_{dA} + CLEN_A <= t_{dM} + DLEN_M$ $t_{dA} + CLEN_A >= t_{dM} + DLEN_M$ $t_{dB} - DLEN >= t_{dM} + DLEN_M$ $t_{dN} >= t_{dA} + CLEN_A + DLEN_A$ $t_d < t_{dM} + DLEN_M$ $t_{dN>} = _{td} + DLEN$ $t_d >= t_{dM} + DLEN_M$

The decision logic therefore consists of a matrix of comparator cells as defined above. The optimum choice is the earliest command issue time and this is determined by a simple priority encoder.

The reorder pipe control logic must dynamically determine what operation is to be done on each element of the command and data pipes.

In the pending command pipe, each pipe element has 4 possible operations, read from previous element (pipe advances), hold current contents (pipe holds), read from next element (pipe backs up) and read from incoming command bus. A multiple set of conditions may exist at various points in the pipe as defined by four cases. The element from which issues are made to the SLiMAC is defined as element 0 while the element farthest from issue is defined as element M. An insertion to an element N will be made is the reorder determination logic finds that the optimum insertion spot in the current pipeline is between elements N−1 and N.

Case 1—Hold

The pipe holds as there is no issue to the SLiMAC or insertion of a new command.

Case 2—Hold & Insert

In this case there is no issue to the SLiMAC, but there is an insertion of a new command into the pipe. If an insertion occurs at the element N, then the pipe will hold from element 0 to element N−1, insert at element N and backs up from element N+1 to element M.

Case 3—Issue

In this case there is an issue to the SLiMAC from element 0 and the rest of the pipe will advance so that element 0 will contain the contents of element 1, element 1 will contain the contents of element 2 and so on until element M—1 contains the contents of element M.

Case 4—Issue & Insert

In this case there is an issue to the SLiMAC from element 0 and an insertion at element N. In this case elements 0 to N−2 are given advance operations, element N−1 is given an insert operation while elements N to M will hold. As an advance is given to the element that will store the data from the element behind it, the insertion at element N (the element is to be inserted between element N−1 and element N of the current pipe) actually means that the inserted element will end up in position N−1 of the updated pipe.

Figure 20:
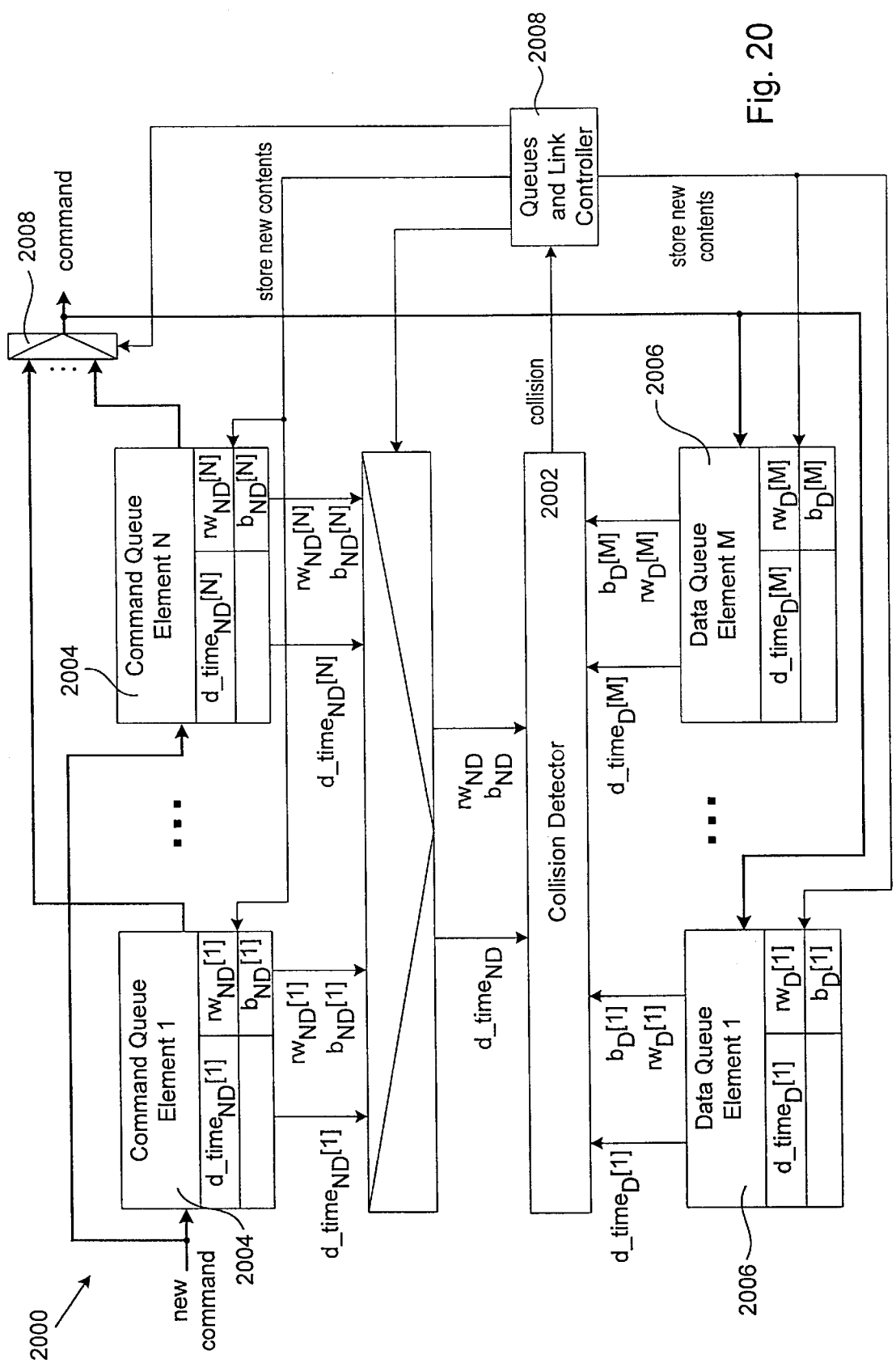
FIG. 20 illustrates a collision detection system that is another implementation of the collision detection system shown in FIG. 15.

FIG. 20 illustrates a collision detection system 2000 that is another implementation of the collision detection system 1500 shown in FIG. 15. In this embodiment, the collision detection system 2000 reorders commands to achieve an optimal command sequence based on target response restrictions and determines the optimal slot for data transfer between initiator controller and target subsystem. Because the reordering of the commands can not cause collision of the different data packets on the data bus, a collision detector 2002 that prohibits to the issuance of a particular command if the command data transfer related to this particular command would cause data conflict is required. In the describe embodiment, the collision detection system 2000 includes the collision detector 2002 that is coupled to a command queue 2004.

In the described embodiment, the collision detector 2002 detects all possible data collisions between a "to be issued" command (that is stored in a command queue 2004) and "already issued" commands (that are stored in a data queue 2006). In the described embodiment, there are N command queues 2004 each being coupled to a multiplexer 2008. Each of the N command queues 2004 are arranged to store those commands that are to be issued, a time factor "d_time$_{ND}$", indicating when the data transfer will appear on a data bus between the universal controller 104 and the target device (i.e., shared resource) 108 after the command was issued to the target device, a burst-bit ($b_{ND}$) indicating data burst transfer, and a read/write bit ($rw_{ND}$). In the described embodiment, the data queue 2006 stores a time factor "d_time$_D$" indicating when the data transfer will appear on the data bus between controller 104 and the target device 108 for an already issued request to the target device. The command queue 2006 also stores the burst-bit ($b_{ND}$) and the read/write bit ($rw_{ND}$).

In a preferred embodiment, the collision detection system 2000 includes a queues and link controller unit 2010 arranged to store and reorder those commands that are to be issued. The queues and controller unit 2010 also calculates the new issue time of commands and a time when the data appears on the data bus. The queues and controller unit 2010 also transfers the issued element from the command queue into the data queue as well as removing it from the command queue after the command was issued. The queues and controller unit 2010 also removes data elements from the data queue after the access to the memory has been completed.

Figure 21:
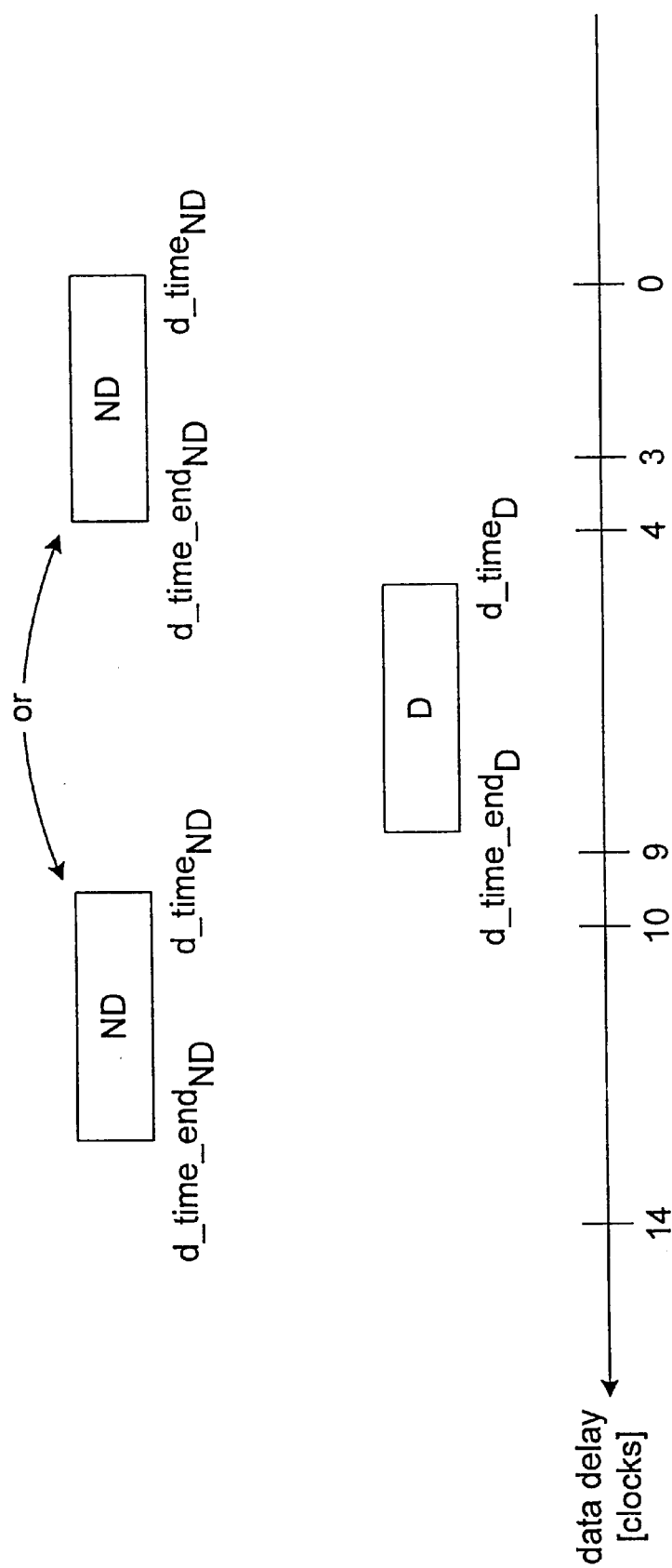
FIG. 21 shows an exemplary timing diagram illustrating how every read/write command to the target device has related to it a data packet transfer.

Referring to FIG. 21, every read/write command to the target device has related to it a data packet transfer. Before the issue of the command to the target device the new data packet ND (New Data) is checked according to it's timing information to see if it can be inserted into the data queue without collision. In this example shown in FIG. 21, an issued data packet D is already placed in the data queue and a new data packet ND is compared against the issued data packet D. It should be noted that both the issued data packet D and the new data packet ND represent burst accesses. In this example, therefore, there are two possibilities how the new data packet ND can be placed in respect to the issued data packet D without causing a data collision. The new data packet ND can be placed on the left side or on the right side of the issued data packet D.

This particular example illustrates collision detection of the memory controller that supports both non-burst and burst data transfer (i.e., 4 data streams). Due to the bi-directional nature of the data bus, one clock cycle must be inserted between consecutive read-write or write-read transfers.

It should be noted that there are many possible outcomes, some of which are listed below.

1) There is no collision between D and ND if ND is placed behind or before D.
2) Between consecutive read-write or write-read data transfers one clock cycle has to be inserted. Every element of Command and Data Queues stores a "rw" bit which indicates whether the operation is "read data" (rw=0) or "write data (rw=1).

3) Data packets consist of one data stream (no-burst transfer) or four streams (burst transfer). Every element of Command and Data Queues stores a "burst" bit which indicates whether the operation is "burst transfer" (burst=1) or "no-burst transfer" (burst=0).

The comparisons that must be made at each to be issued data packet and issued data packet pair for each to be issued command are:

```
// the initialization of variable collision=NO;
// the end of the new packets from Command Queue is
   determine depends on burst bit
   if (burst_ND=1) then d_time_end_ND=d_time_ND+3
   else d_time_end_ND=d_time_ND
   for i=1 to last_element_from_Data_Queue
   begin
      // the end of the packets from Data Queue is deter-
         mine depends on burst bit
      if (burst_D[i]=1) then d_time_end_D[i]=d_time_D[i]+3
      else d_time_end_D[i]d_time_D[i]
   // between two consecutive read/write or write/read one
      clock has to be implemented
      if (rw_D[i]=rw_ND) then
      begin
         d_time_end_D[i]=d_time_end_D[i]+1
         d_time_end_ND=d_time_end_ND+1
      end
   // collision detection
      if NOT((d_time_ND>d_time_endD[i]) or (d_time_D[i]
         >d_time_end_ND))
   collision=YES;
   end.
```

Figure 22:
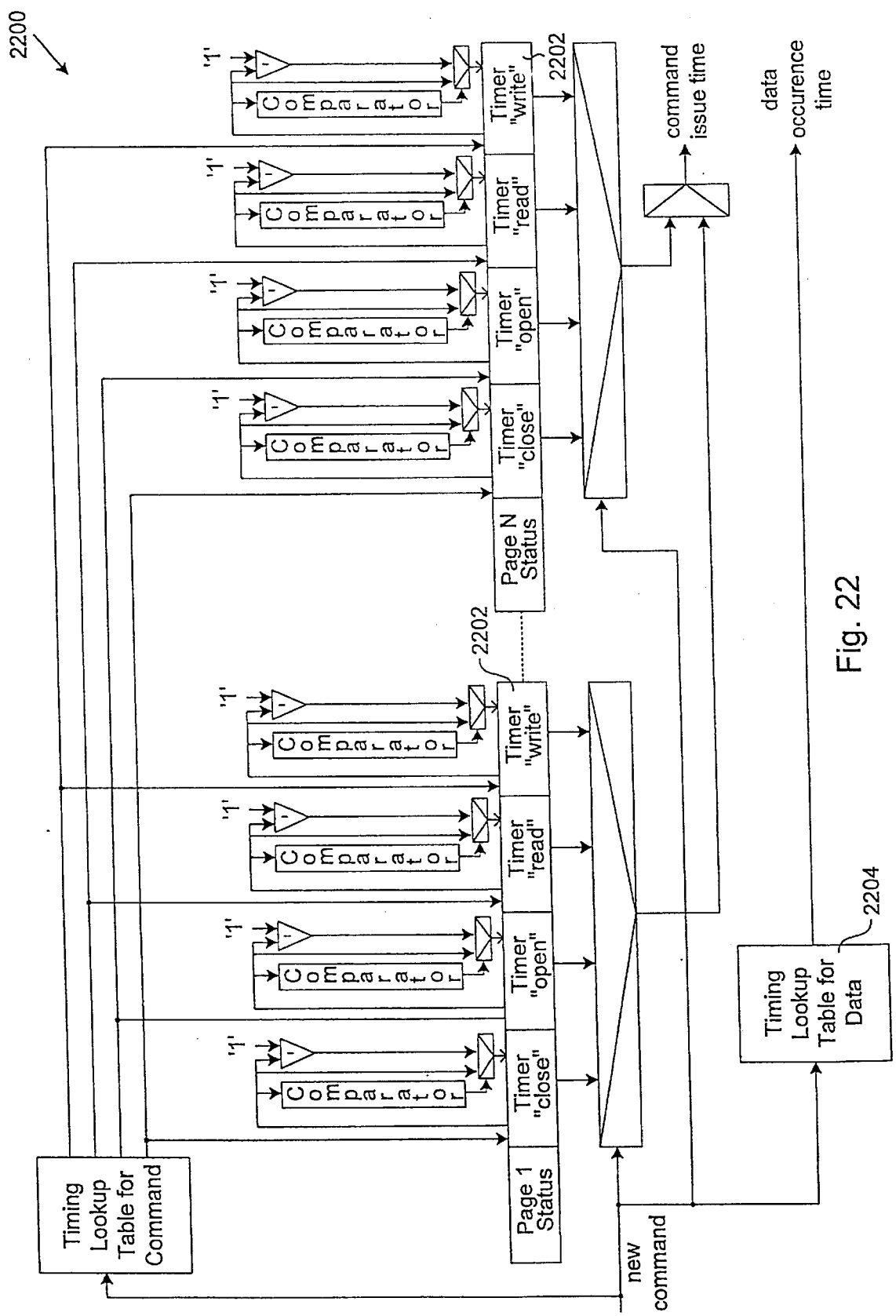
FIG. 22 illustrates a predictor system having N page timers that store time between last issued command to the particular page and a predicted next access to that memory.

In yet another embodiment of the invention, an apparatus and method for predicting the time between two consecutive memory accesses is disclosed that allows for very fast calculation of the earliest "command issue time" for the new command. Referring to FIG. 22, illustrating a predictor system 2200 having N page timers 2202 that store time between last issued command to the particular page and a predicted next access to that memory. The next access to the same page can be "close", "open", "write" or "read". The incoming new command (e.g. read) selects one particular page timer indicating how long a particular page access has to wait before the issue. The same new command then selects appropriate contents of a timing lookup table 2204 which has to be inserted between this command (read) and possible next accesses (close, open, write and read) to the same page. The resolution of timers is one clock cycle. Timing Lookup Table—Data stores time, which indicates how cycles after the issue of the command the data on the data bus will be valid. If the new command is inactive then every cycle the value of all Page Timers is until their value reached "0".

Figure 23:
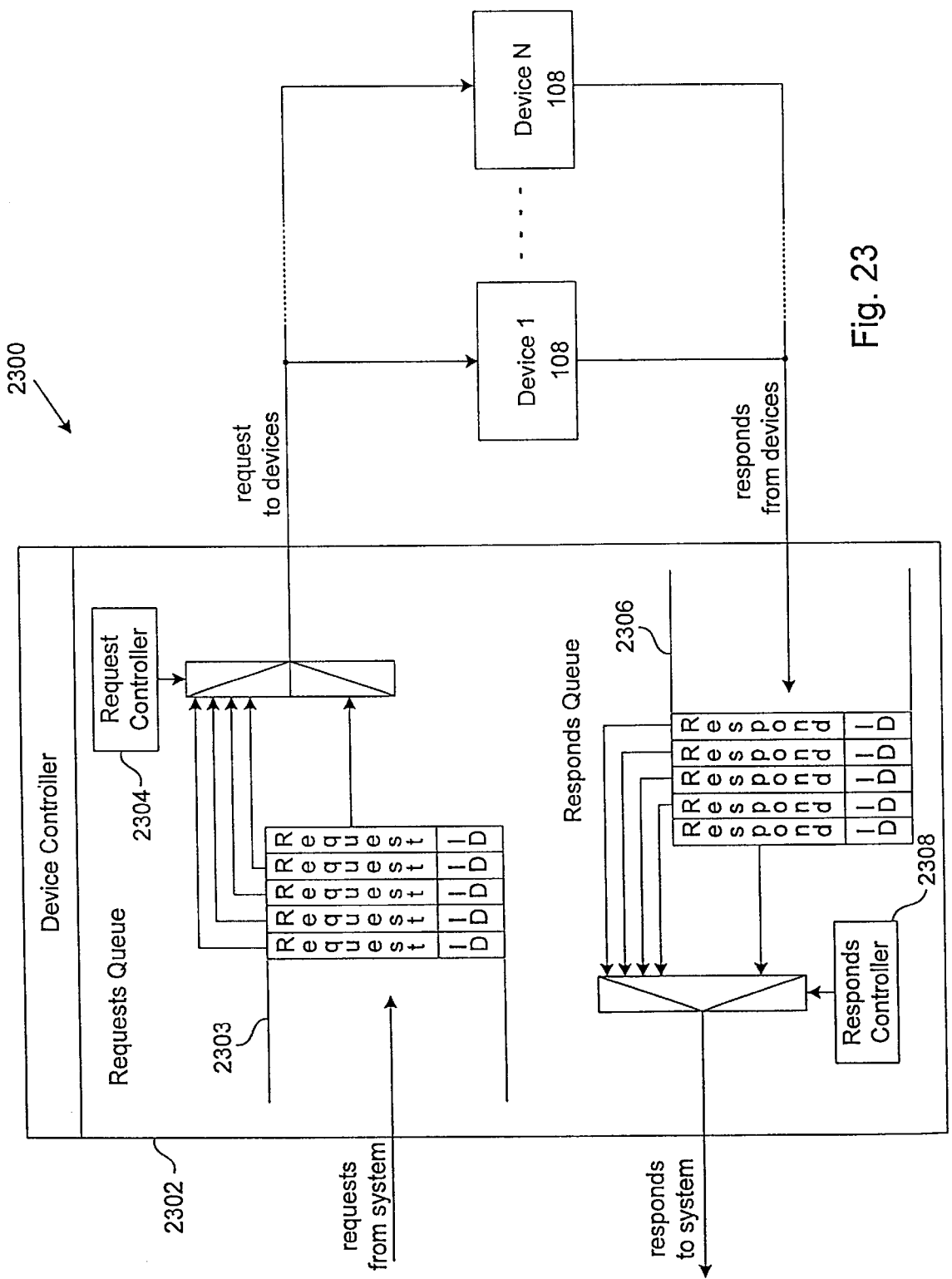
FIG. 23 shows a device controller having a device access prioritizer in accordance with an embodiment of the invention.

Referring now to FIG. 23, in still another embodiment of the invention, a device controller 2300 having a device access prioritizer 2302 in accordance with an embodiment of the invention is shown. In the described embodiment, the prioritizer 2302 includes a requests queue 2303 suitable for receiving and storing any number of device requests coupled to a requests controller unit 2304 that is used to, in part, fetch a particular response from any position in the requests queue 2303 and transmit the fetched response to an appropriate one of the plurality of shared devices 108. In the described embodiment, the prioritizer 2302 also includes a responds queue 2306 arranged to receive and store responses from any of the shared devices 108 coupled to a responds controller unit 2308 used to select particular stored responses to be delivered to the requesting device 102.

In a preferred embodiment, each response and request has associated with it the ID number 150 shown in FIG. 1E such that each request and its associated response have the same ID number 150. As discussed previously, the ID number 150 includes 5 data bits, wherein the first and second data bit are the group selector field 152 that identifies the group of requesting devices (such as a group of processors in a multi-processor computing environment) to which that particular response/request belongs. Again, as discussed above, the request number field (RN) 153 represents the number of requests and/or responses associated with the group of requesting devices identified by the group selector field 152 such that consecutive requests from the same requesting device, for example, have consecutive request number fields 153.

During operation, both the requests and responds controllers 2304 and 2308, respectively, incorporate the group priority selector register 154, the livelock counter register 156, and a reordering selector 2312. The group priority selector register 154 includes priority information for a particular requests/response group identified by the RN 152, wherein in one embodiment, a value of "3" represents a highest priority whereas a value of "0" represents a lowest priority such that the request with the higher priority can bypass the request with the lower priority.

In order to avoid a livelock situation, the livelock counter register 156 contains information about how many consecutive requests (or responses) with the higher priority can bypass requests (or responses) with the lower priority. It should be noted that the livelock counter register 156 is active only in those situations where the request with the higher priority bypasses the request with the lower priority. If, in fact, there is no request (or response) with the lower priority in the appropriate queue, then the livelock counter register 156 is inactive.

Although only a few embodiments of the present invention have been described in detail, it should be understood that the present invention may be embodied in many other specific forms without departing from the spirit or scope of the invention. Therefore, the present examples are to be considered as illustrative and not restrictive, and the invention is not to be limited to the details given herein, but may be modified within the scope of the appended claims.

What is claimed is:

1. A method for reordering commands to achieve an optimal command sequence based on a target response restriction that determines an optimal slot for a data transfer between an initiator controller and a target subsystem by prohibiting an issuance of a command that would cause a data conflict, comprising:
   at a command queue,
      storing a command to be issued,
      storing a time indicating when the data transfer appears on a data bus between the controller and the target device after the command was issued to the target,
      storing a burst-bit indicating data burst transfer and a read/write bit (r/w); in a data queue coupled to the command queue,
      storing a time indicating when the data transfer will appear on the data bus between the controller for an already issued request to the target device, and
      storing the burst bit and the read/write bit (r/w); at a collision detector coupled to the data queue and the command queue,
      detecting the possible collisions on the data bus between the issued command that is stored in the command queue and already issued commands that are stored in the data queue;

storing target subsystem characterization data at a target subsystem characterization data base; and at a queues and link controller coupled to the collision detector the data queue and the command queue, reordering commands to be issued wherein the controller calculates the new issue time of commands as well as a time when the data appears on the data bus, wherein the new issue time is based at least in part on the target subsystem characterization data, and storing the reordered commands.

2. A method as recited in claim 1, wherein the target subsystem is a first one of a plurality of target subsystems.

3. A method as recited in claim 2, wherein the target subsystem characterization data base includes characterization data specific to each of the plurality of target subsystems.

4. A method as recited in claim 1, wherein the target subsystem is a memory device.

5. A method as recited in claim 4, wherein the memory device is a SLDRAM type memory device.

6. An apparatus for reordering commands to achieve an optimal command sequence based on a target response restriction that determines an optimal slot for a data transfer between an initiator controller and a target subsystem by prohibiting an issuance of a command that would cause a data conflict, comprising:

at a command queue,
  a means for storing a command to be issued,
  a means for storing a time indicating when the data transfer appears on a data bus between the controller and the target device after the command was issued to the target,
  a means for storing a burst-bit indicating data burst transfer and a read/write bit (r/w); in a data queue coupled to the command queue, a means for storing a time indicating when the data transfer will appear on the data bus between the controller for an already issued request to the target device, and
  a means for storing the burst bit and the read/write bit (r/w); at a collision detector coupled to the data queue and the command queue,
  a means for detecting the possible collisions on the data bus between the issued command that is stored in the command queue and already issued commands that are stored in the data queue;
  a means for storing target subsystem characterization data at a target subsystem characterization data base; and
  at a queues and link controller coupled to the collision detector the data queue and the command queue,
  a means for reordering commands to be issued wherein the controller calculates the new issue time of commands as well as a time when the data appears on the data bus, wherein the new issue time is based at least in part on the target subsystem characterization data, and
  a means for storing the reordered commands.

7. An apparatus as recited in claim 6, wherein the target subsystem is a first one of a plurality of target subsystems.

8. An apparatus as recited in claim 7, wherein the target subsystem characterization data base includes characterization data specific to each of the plurality of target subsystems.

9. An apparatus as recited in claim 6, wherein the target subsystem is a memory device.

10. An apparatus as recited in claim 9, wherein the memory device is a SLDRAM type memory device.

\* \* \* \* \*